(12) United States Patent
Brothers et al.

(10) Patent No.: US 7,737,983 B2
(45) Date of Patent: Jun. 15, 2010

(54) GPU PIPELINE MULTIPLE LEVEL SYNCHRONIZATION CONTROLLER PROCESSOR AND METHOD

(75) Inventors: John Brothers, Calistoga, CA (US);
Timour Paltashev, Fremont, CA (US);
Hsilin Huang, Cupertino, CA (US);
Boris Prokopenko, Milpitas, CA (US);
Qunfeng (Fred) Liao, San Jose, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 855 days.

(21) Appl. No.: 11/552,693

(22) Filed: Oct. 25, 2006

(65) Prior Publication Data

US 2007/0091102 A1 Apr. 26, 2007

Related U.S. Application Data

(60) Provisional application No. 60/730,444, filed on Oct. 26, 2005.

(51) Int. Cl.
*G06F 1/20* (2006.01)
*G06T 1/00* (2006.01)
(52) U.S. Cl. .................................. 345/522; 345/506
(58) Field of Classification Search ................ 712/228; 345/522, 506, 505; 718/100, 102, 103, 107
See application file for complete search history.

(56) References Cited

U.S. PATENT DOCUMENTS

| | | | | |
|---|---|---|---|---|
| 4,855,936 A | * | 8/1989 | Casey et al. | 345/520 |
| 4,862,155 A | * | 8/1989 | Dalrymple et al. | 345/581 |
| 4,916,301 A | * | 4/1990 | Mansfield et al. | 345/440 |
| 5,097,411 A | * | 3/1992 | Doyle et al. | 345/522 |
| 5,230,039 A | * | 7/1993 | Grossman et al. | 345/582 |
| 5,293,587 A | * | 3/1994 | Deb et al. | 345/553 |
| 5,299,309 A | * | 3/1994 | Kuo et al. | 345/541 |
| 5,315,696 A | * | 5/1994 | Case et al. | 345/522 |
| 5,706,478 A | | 1/1998 | Dye | |
| 6,208,361 B1 | | 3/2001 | Gossett | |

(Continued)

OTHER PUBLICATIONS

Brothers, et al., Non-Final Office Action, mailed Apr. 22, 2009, filed Aug. 30, 2006, U.S. Appl. No. 11/468,435.

(Continued)

*Primary Examiner*—Kee M Tung
*Assistant Examiner*—Robert Craddock
(74) *Attorney, Agent, or Firm*—Thomas, Kayden, Horstemeyer & Risley

(57) ABSTRACT

A method for high level synchronization between an application and a graphics pipeline comprises receiving an application instruction in an input stream at a predetermined component, such as a command stream processor (CSP), as sent by a central processing unit. The CSP may have a first portion coupled to a next component in the graphics pipeline and a second portion coupled to a plurality of components of the graphics pipeline. A command associated with the application instruction may be forwarded from the first portion to the next component in the graphics pipeline or some other component coupled thereto. The command may be received and thereafter executed. A response may be communicated on a feedback path to the second portion of the CSP. Nonlimiting exemplary application instructions that may be received and executed by the CSP include check surface fault, trap, wait, signal, stall, flip, and trigger.

32 Claims, 14 Drawing Sheets

U.S. PATENT DOCUMENTS

| | | |
|---|---|---|
| 6,252,610 B1 | 6/2001 | Hussain |
| 6,329,996 B1 | 12/2001 | Bowen et al. |
| 6,476,808 B1 | 11/2002 | Kuo et al. |
| 6,483,505 B1 | 11/2002 | Morein et al. |
| 6,708,269 B1 | 3/2004 | Tiruvallur et al. |
| 6,782,432 B1 | 8/2004 | Nelson et al. |
| 6,806,880 B1 | 10/2004 | Mukherjee et al. |
| 6,833,831 B2 | 12/2004 | Emberling et al. |
| 6,867,781 B1 * | 3/2005 | Van Hook et al. ........... 345/506 |
| 6,954,204 B2 * | 10/2005 | Zatz et al. ................... 345/522 |
| 7,353,369 B1 | 4/2008 | Coon et al. |
| 2003/0001840 A1 | 1/2003 | Spitzer et al. |
| 2003/0023971 A1 | 1/2003 | Martinolich et al. |
| 2003/0169259 A1 | 9/2003 | Lavelle et al. |
| 2004/0008200 A1 * | 1/2004 | Naegle et al. ............... 345/505 |
| 2004/0135787 A1 | 7/2004 | Parikh et al. |
| 2004/0160446 A1 | 8/2004 | Gosalia et al. |
| 2004/0189650 A1 | 9/2004 | Deering |
| 2005/0030311 A1 | 2/2005 | Hara et al. |
| 2005/0046633 A1 * | 3/2005 | Aleksic et al. .............. 345/522 |

OTHER PUBLICATIONS

Brothers, et al., Non-Final Office Action, mailed Jun. 8, 2009, filed Oct. 25, 2006, U.S. Appl. No. 11/552,649.

* cited by examiner

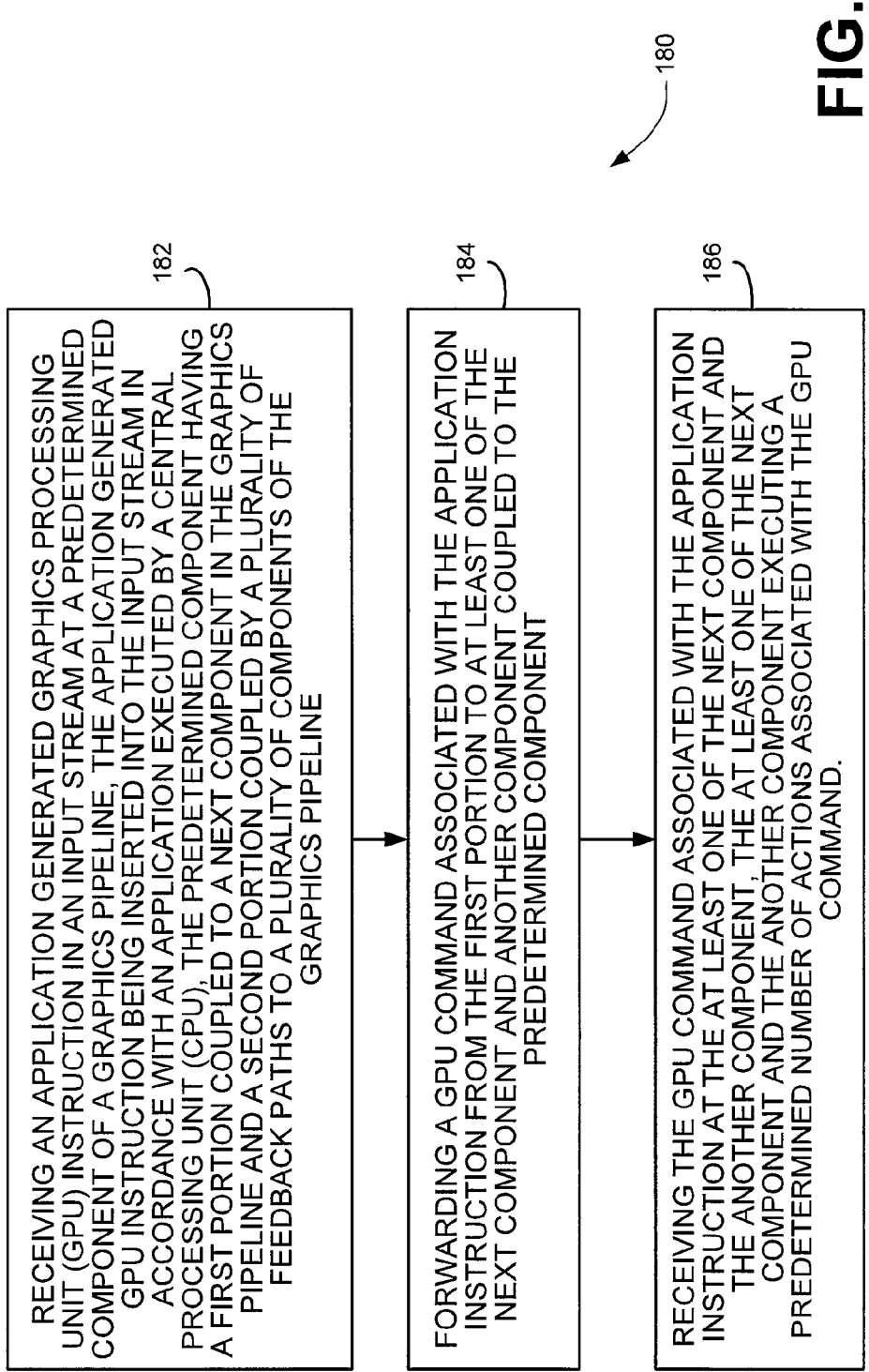

GPU PIPELINE MULTIPLE LEVEL SYNCHRONIZATION CONTROLLER PROCESSOR AND METHOD

CROSS REFERENCE TO RELATED APPLICATION

This application claims priority to U.S. Provisional Application entitled "GPU Synchronization and Scheduling System, Method, and Apparatus," having Ser. No. 60/730,444, as filed on Oct. 26, 2005, which is entirely incorporated herein by reference. This application is also related to copending U.S. patent applications Ser. No. 11/468,135 filed Aug. 30, 2006 and Ser. No. 11/552,649 filed Oct. 25, 2006.

TECHNICAL FIELD

The present disclosure relates to graphic processing, and more particularly, to a method and apparatus for synchronizing and controlling a graphics pipeline.

BACKGROUND

Current computer applications are generally more graphically intense and involve a higher degree of graphics processing power than predecessors. Applications, such as games, typically involve complex and highly detailed graphics renderings that involve a substantial amount of ongoing computations. To match the demands made by consumers for increased graphics capabilities in computing applications, like games, computer configurations have also changed.

As computers, particularly personal computers, have been programmed to handle programmers' ever increasingly demanding entertainment and multimedia applications, such as high definition video and the latest 3D games, higher demands have likewise been placed on system bandwidth. Thus, methods have arisen to deliver the bandwidth for such bandwidth hungry applications, as well as providing additional bandwidth headroom for future generations of applications.

For these reasons, current computer systems oftentimes include multiple processors. For example, a graphics processing unit (GPU) is an example of a coprocessor in addition to a primary processor, such as a central processing unit (CPU), that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU and/or other coprocessing devices may reside on a separate but electrically coupled card, such as a graphics card in the case of the GPU.

A coprocessor such as a GPU may often access supplemental memory, such as video memory, for performing its processing tasks. Coprocessors may be generally configured and optimized for performing specialized tasks. In the case of the GPU, such devices may be optimized for execution of three dimensional graphics calculations to support applications with intensive graphics. While conventional computer systems and coprocessors may adequately perform when running a single graphically intensive application, such computer systems and coprocessors may nevertheless encounter problems when attempting to execute multiple graphically intensive applications at once.

It is not uncommon for a typical coprocessor to schedule its processing workload in an inefficient manner. In some operating systems, a GPU may be multitasked using an approach that submits operations to the GPU in a serialized form such that the GPU executes the operations in the order in which they were received.

One problem with this approach is that it does not scale well when many applications with differing priorities access the same resources. In this nonlimiting example, a first application that may be currently controlling the resources of a GPU coprocessor needs to relinquish control to other applications for the other applications to accomplish their coprocessing objectives. If the first application does not relinquish control to the other waiting application, the GPU may be effectively tied up such that the waiting application is bottlenecked while the GPU finishes processing the calculations related to the first application. As indicated above, this may not be a significant bottleneck in instances where a single graphically intensive application is active; however, the problem of tying up a GPU or other coprocessor's resources may become more accentuated when multiple applications attempt to use the GPU or coprocessor at the same time.

The concept of apportioning processing between operations has been addressed with the concept of interruptible CPUs that context switch from one task to another. More specifically, the concept of context save/restore has been utilized by modern CPUs that operate to save the content of relevant registers and program counter data to be able to resume an interrupted processing task. While the problem of apportioning processing between the operations has been addressed in CPUs, where the sophisticated scheduling of multiple operations is utilized, scheduling for coprocessors has not been sufficiently addressed.

At least one reason for this failure is related to the fact that coprocessors, such as GPUs, are generally viewed as a resource to divert calculation-heavy and time consuming operations away from the CPU so that the CPU may be able to process other functions. It is well known that graphics operations can include calculation-heavy operations and therefore utilize significant processing power. As the sophistication of graphics applications has increased, GPUs have become more sophisticated to handle the robust calculation and rendering activities.

Yet, the complex architecture of superscalar and EPIC-type CPUs with parallel functional units and out-of-order execution has created problems for precise interruption in CPUs where architecture registers are to be renamed, and where several dozens of instructions are executed simultaneously in different stages of a processing pipeline. To provide for the possibility of precise interrupts, superscalar CPUs have been equipped with a reorder buffer and an extra stage of "instruction commit (retirement)" in the processing pipeline.

Current GPU are becoming more and more complex by including programmable and fixed function units connected by multiple FIFO-type buffers. Execution of each GPU command may take from hundreds to several thousand cycles. GPU pipelines used in today's graphics processing applications have become extremely deep in comparison to CPUs. Accordingly, most GPUs are configured to handle a large amount of data at any given instance, which complicates the task of attempting to apportion the processing of a GPU, as the GPU does not have a sufficient mechanism for handling this large amount of data in a save or restore operation.

Modern GPU configurations that have evolved so as to handle large amounts of data have taken upon complex shapes that involve new mechanisms for synchronization for the pipeline units in data stream processing. Using programmable parallel processing units in addition to main fixed function graphics pipeline units involves maintaining the order of graphics primitive data that may be received and updated in the different stages of the GPU pipeline. Plus, maintaining multiple contexts simultaneously with interruptability in the graphics pipeline of the GPU involves the resynchronization of such interrupted context with minimal performance loss and smooth switching between an interrupted and resumed graphics context. Current GPU configurations, however, do not handle synchronization of contexts well, instead resulting in a complete flush of the pipeline, thereby resulting in less efficient operation and reduced graphics capabilities.

Further, multi pass rendering when a GPU renders a surface that becomes a source surface for a next pass also involves synchronization to avoid RAW data hazards when a second pass starts to access the shared surface. Plus, synchronization with CPU task execution when a GPU is supposed to start and/or resume a certain context execution depending upon events in CPU threads and current GPU context is also an issue in current GPU processing implementations. Yet, current CPUs are simply unable to communicate and respond to such changes in a timely manner so as to maintain pace with the increasing demands of graphics applications.

Thus, there is a heretofore-unaddressed need to overcome these deficiencies and shortcomings described above.

SUMMARY

A method for high level synchronization between an application and a graphics pipeline comprises receiving an application instruction in an input stream at a predetermined component, such as a command stream processor (CSP), as sent by a central processing unit. The CSP may have a first portion coupled to a next component in the graphics pipeline and a second portion coupled to a plurality of components of the graphics pipeline. A command associated with the application instruction may be forwarded from the first portion to the next component in the graphics pipeline or some other component coupled thereto. The command may be received and thereafter executed. A response may be communicated on a feedback path to the second portion of the CSP. Nonlimiting exemplary application instructions that may be received and executed by the CSP include check surface fault, trap, wait, signal, internal stall, flip, and trigger.

If the application instruction is a check surface fault instruction, a command may be communicated from the CSP to a recipient component to check a virtual memory and determine the availability of all surfaces for a particular context to be executed in the graphics pipeline. The CSP may interrupt the particular context if the virtual memory lacks all surfaces for the particular context. In this instance, the CSP may switch to a new context and begin executing that context. Otherwise, execution of the particular context may continue if the virtual memory contains all surfaces for the particular context upon communicating the command from the CSP to the recipient component.

An interrupt may also be generated to retrieve all surfaces not contained in the virtual memory from the location where the surfaces are stored. When all of the surfaces are retrieved and available in the virtual memory, the CSP may subsequently resume execution of the previously interrupted context.

If the application instruction is a trap instruction, the CSP may forward a trap token from the first portion (which may be known as a front-end portion) of the CSP to the next component in the graphics pipeline. Thereafter, the trap token may be communicated through the graphics pipeline to a graphics pipeline last stage component, which, as a nonlimiting example, may be a write back unit.

The graphics pipeline last stage component may then communicate the trap token back to the CSP, but to the second portion of the CSP (which may be known as a back-end portion) that is configured for receiving such communications. Thereafter, the CSP may generate an interrupt message to the central processing unit associated with receipt of the trap token by the second portion of the CSP. The central processing, unit upon receipt of the interrupt message, may recognize receipt of the interrupt message in association with an end of processing in the graphics pipeline of a designated command or data, such as a given context. Also, the CSP may store identification information about the trap token in a memory.

If the application instruction is a wait instruction, the CSP, after recognizing the wait instruction in the input stream from the central processing unit to the CSP, may check a counter to determine if a value of the counter is greater than or equal to a threshold value. The threshold may be set at zero or some other predetermined or predefined value. If the value of the counter is greater than the threshold value, the CSP may decrement the counter and continue to execute instructions associated with a current graphics context. However, if the value of the counter is equal to the threshold value, then the CSP (or a portion of the CSP) may cause a switch from the current graphics context to another graphics context, which may be a set of instructions in a list of contexts wherein each context pertains to a different set of instructions for related objects. In switching to another graphics context, an instruction pointer may also be reset by the CSP for the new graphics context to be executed.

This counter may, as a nonlimiting example, be an internal flip counter on the graphics processing unit or may be external in a coupled video memory. Plus, in at least one nonlimiting example, the counter (either internal or external in memory) may be configured as a 64-bit counter, but one of ordinary skill in the art would know that counters of other logical sizes could also be used.

If the application instruction is a signal instruction, the CSP, upon recognizing such in the input stream from the central processing unit to the CSP, may increment a counter by one unit. The counter may be logically located in correspondence with an address contained in the signal command. Thereafter, the CSP may interrupt the central processing unit if a predetermined bit is set to a predetermined logical state and a value of the counter changes from a first particular value to a second particular value. As nonlimiting examples, the first particular value may be zero (0), and the second particular value may be (1).

If the application instruction is a flip instruction, the CSP may send a flip token from a first portion of the CSP to the next component in the graphics pipeline, which could be a triangle setup unit, as one of ordinary skill in the art would know. The flip token may migrate through the graphics pipeline to a last stage component in the graphics pipeline, which, as one of ordinary skill in the art would know, could be a write back unit. The last stage component in the graphics pipeline may thereafter forward the flip token to a second (or back-end portion) of the CSP that is configured to receive such communications.

Upon receipt of the flip token, the CSP may engage in a wait configuration for a signal to be received from a display interface unit, which may be one of many units or components in the graphics processing unit that are coupled to the CSP.

The CSP may also, however, program a predetermined register of the display interface unit with data associated with the flip token.

So as to avoid stalling the last stage component in the graphics pipeline, the CSP may be coupled to a buffer configured to receive flip tokens from the last stage component. The buffer may be a FIFO, which forwards the flip tokens to the CSP in the order received from the last stage component in the graphics pipeline.

Yet another application instruction executable by the CSP is a mask instruction. The mask instruction provides that the CSP may check a designated counter to determine if a value of the counter is equal to a predefined value, such as zero (0). If so, the CSP may check for the receipt of a predefined signal from a predefined unit, such as the display interface unit. The CSP may be stalled from further operations until the signal is received from the predefined unit. However, if the value of the counter, when checked by the CSP is greater than the predefined value, which, again, could be zero (0), the CSP may decrement the counter by one.

The CSP may also be configured to receive a trigger instruction in the input stream, which may lead to a predefined response. As a nonlimiting example, the CSP may output an operation code, or opcode to a target component, which, as a nonlimiting example, could be any unit in the graphics processing unit. The opcode may instruct the target component to take a predefined action, which when received by the target component, results therein. As nonlimiting examples, the predefined actions could include: a preload action, a flush action, and a drain action.

Based on the type of trigger instruction, the CSP may or may not be stalled until completion of the operation contained in the trigger, which may be performed by one or more components other than the CSP in the graphics pipeline. So the CSP may be instructed to wait and may continuously check the status of the wait mask (counter) to determine if it has been lifted. When lifted, the CSP may resume processing operations in the input stream.

The application instruction may comprise an operation code portion and at least one double word portion containing at least one of identification information, address information, and data. As a nonlimiting example, each operation code and at least one double word portion may be 32 bits.

The application instruction may also be an internal stall instruction, which comprises receiving the internal stall instruction in the input stream at the CSP. Thereafter a flip counter may be checked to determine if a value of the counter is equal to a predefined value. The CSP may further check for receipt of a predefined signal from a predefined unit if the value of the counter is equal to the predefined value. Thereafter, the CSP may stall from additional operations until the predefined signal is received.

A wait mask counter may be checked in accordance with the internal stall instruction. The CSP may be stalled from additional operations if the wait mask counter is not a predefined value, such as 0.

Yet another type of receivable instruction is a wait mask instruction, which comprises receiving a wait instruction in the input stream at the CSP with a wait mask set portion. The CSP may also receive a target operation command that is forwarded to a block in the graphics pipeline. The block in the graphics pipeline may perform a predetermined operation in correspondence with data in the target operation.

The CSP may receive a wait clear trigger instruction that is forwarded to the block in the graphics pipeline and subsequently back to the CSP. An internal wait command with a wait mask status check may be received at the CSP, and a determination may be made whether the wait clear trigger instruction has been received back at the CSP such that the wait mask set portion may be cleared.

These features described herein in this section of the disclosure are merely nonlimiting examples, as additional information related to these nonlimiting examples are described in the sections that follow and the figures of this disclosure.

DETAILED DESCRIPTION OF DRAWINGS

FIG. 14 is a diagram of a method to synchronize an application and a graphics pipeline.

DETAILED DESCRIPTION

Figure 1:
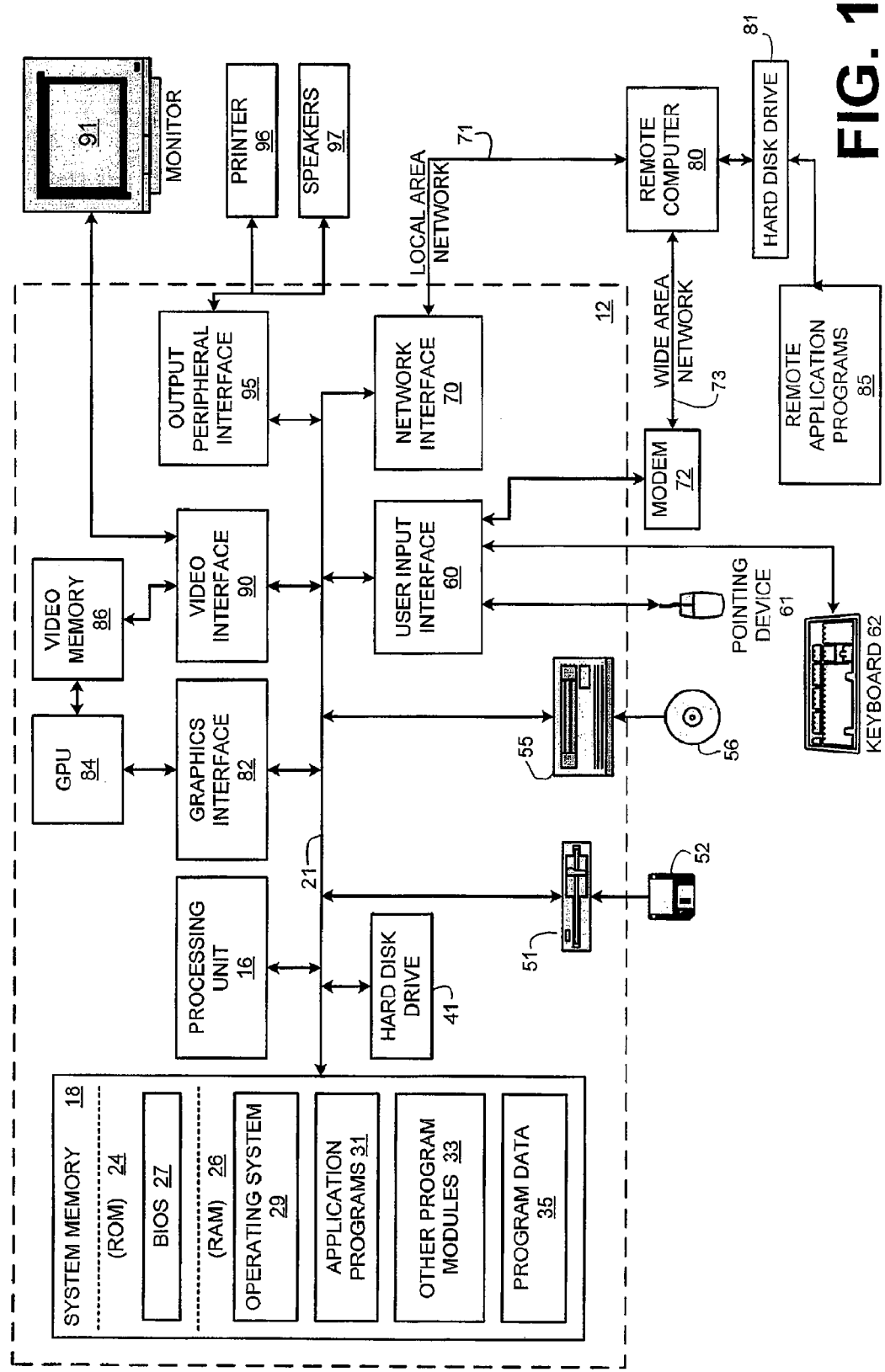
FIG. 1 is a diagram illustrating an exemplary nonlimiting computing system that includes a computer.

FIG. 1 is a diagram illustrating an exemplary nonlimiting computing system 10 that includes a computer 12. The components of the computer 12 may include, as nonlimiting examples, a processing unit 16, a system memory 18, and a system bus 21 that couples various system components, including the system memory 18, to the processing unit 16. The system bus 21 may be any of several types of bus structures, as one of ordinary skill in the art would know, including a memory bus or memory controller, a peripheral bus, and a local bus using any of a variety of bus architectures. As a nonlimiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory, which may be removable, or nonremovable memory.

The system memory 18 may include computer storage media in the form of volatile and/or nonvolatile memory, such as read only memory (ROM) 24 and random access memory (RAM) 26. A basic input/output system 27 (BIOS) may be stored in ROM 24. As a nonlimiting example, operating system 29, application programs 31, other program modules 33, and program data 35 may be contained in RAM 26.

Computer 12 may also include other removable/nonremovable volatile/nonvolatile computer storage media. As a nonlimiting example, a hard drive 41 may read from or write to nonremovable, nonvolatile magnetic media. A magnetic disk drive 51 may read from or write to a removable, nonvolatile magnetic disk 52. An optical disk drive 55 may read from or write to optical disk 56.

A user may enter commands and information into computer 12 through input devices such as keyboard 62 and pointing device 61, which may be coupled to processing unit 16 through a user input interface 60 that is coupled to system bus 21. However, one of ordinary skill in the art would know that other interface and bus structures such as a parallel port, game port, or a universal serial bus (USB) may also be utilized for coupling these devices to the computer 12.

One or more graphics processing units (GPUs) 84 may communicate with the graphics interface 82 that is coupled to system bus 21. As a nonlimiting example, GPU 84 may include on-chip memory storage, such as register storage and cache memory. GPU 84 may also communicate with a video memory 86, as desired.

A monitor 91 or other type of display device may be also coupled to system bus 21 via a video interface 90, which may also communicate with video memory 86. In addition to monitor 91, computer system 10 may also include other peripheral output devices, such as printer 96 and speakers 97, which may be coupled via output peripheral interface 95.

Computer 12 may operate in networked or distributed environments using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would know.

In this nonlimiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

As stated above, the GPU 84 may be configured to switch processes, or contexts, during the processing of another context, or operation. In this instance, the GPU 84 is configured to save an interrupted context and to initiate processing of another context, which itself may have been previously interrupted and saved.

GPU 84 may be configured to support sequential execution of multiple GPU programs (commands) belonging to the same context. Yet, as stated above, in order to synchronize execution of the GPU 84 in tandem with processing unit 16, multiple levels or synchronization may be utilized.

A global level memory data access system synchronization may be a first high level method of synchronizing the processing unit 16 application or driver and a GPU context being implemented by GPU 84. As a second level or an intermediary level of synchronization, memory data access synchronization may occur between two GPU contexts that are being implemented with GPU 84. Thus, as described above, synchronization between two contexts may occur in the instance where one context in interrupted so that a second context may resume or initiate from prior execution. Or another case may be that a second context uses data from a memory surface generated by a first context in the same GPU, which cannot be started before the first context has finished all writes to the particular memory surface. As a third level of synchronization, the pipeline in GPU 84 itself may be configured such that the individual unit or components of the pipeline may be synchronized, which may constitute a lower internal level of synchronization. Thus, three levels of synchronization may be utilized so that the processing unit 16 may be synchronized in tandem with GPU 84 to handle complex and convoluted processing operations.

Figure 2:
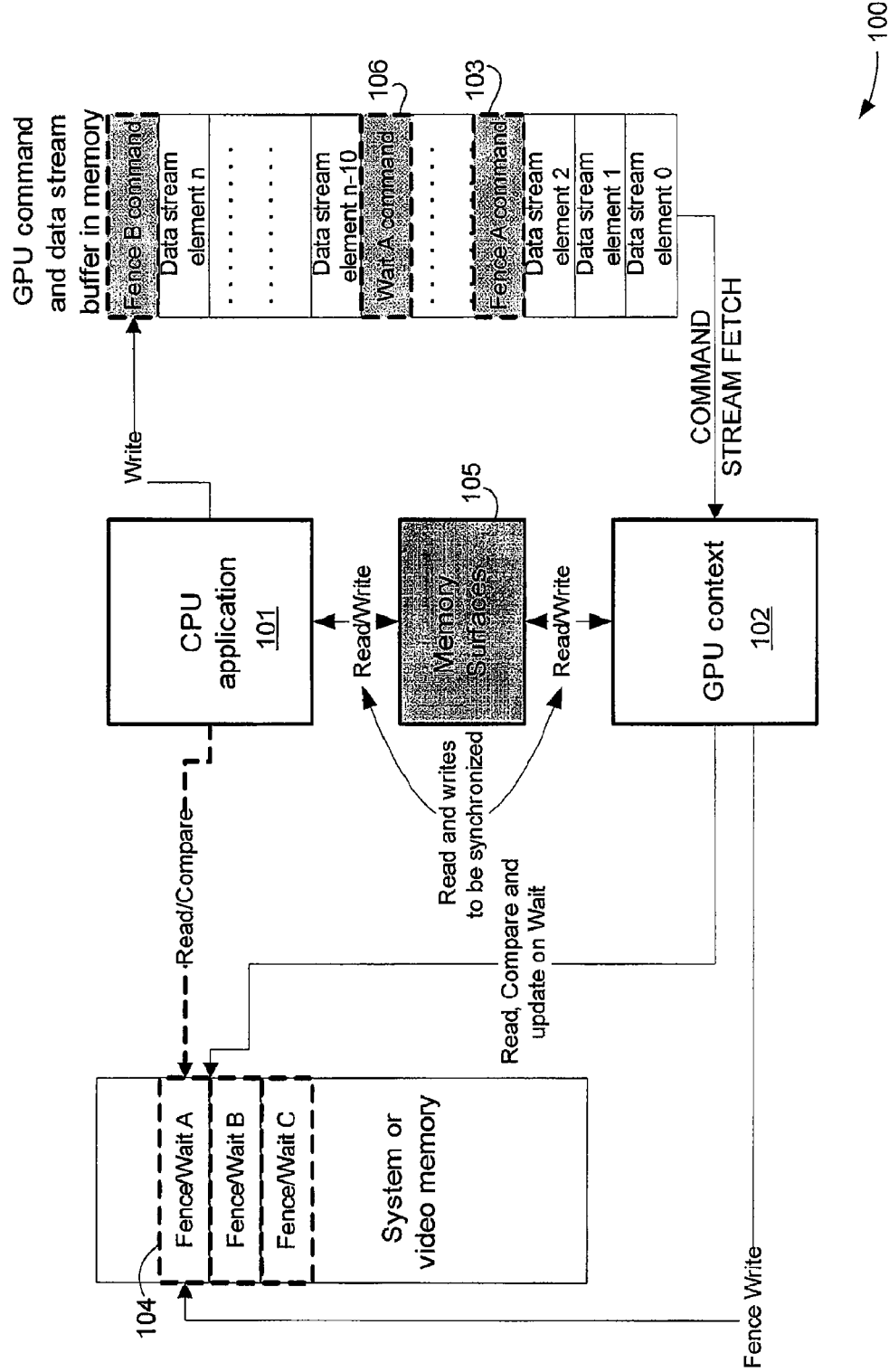
FIG. 2 is a diagram depicting interaction between a CPU application executed by the processing unit of FIG. 1 and a GPU context implemented by the GPU of FIG. 1.

FIG. 2 is a diagram 100 depicting interaction between a CPU application 101 executed by the processing unit 16 of FIG. 1 and a GPU context 102 implemented by the GPU 84 of FIG. 1. In this nonlimiting example, top (high) level data access synchronization between the CPU application 101 and the GPU context 102 is depicted.

Specifically, upon receiving Fence Command A (reference 103) in the GPU command and data stream buffer in memory, which may be written by the CPU application 101, a fence command and data may be written by GPU 84 (as implementing GPU context 102) to registry 104 in system or video memory 86 of FIG. 1. Registry 104 contains pairs of memory location with consecutive addresses for fence and wait register values. The fence command may be written so that read and write operations by CPU application 101 and GPU context 102 with respect to primitives and/or memory surfaces (as represented by block 105) may be synchronized if values in fence and wait pairs will match predetermined requirements.

CPU application 101 may attempt to read the data value of registry 104 so that a comparison between fence and wait values is made. The comparison may indicate to the CPU application 101 whether the GPU context 102 has accomplished a predetermined action, such as completion of a designated task, which might, as a nonlimiting example, enable CPU application 101 to utilize certain data for additional processing operations.

GPU context 102 may subsequently receive Wait A command 106 from the GPU command and data stream shown in FIG. 2. Thereafter, GPU context 102 may perform a read, comparison, and update based on the received Wait A command at registry 104. Subsequently, CPU application 101 may again read and compare the data values of registry 104. However, CPU application 101 may be configured to recognize the updated value based upon receipt of the Wait A command 106 by GPU context 102. Thus, CPU application 101 recognizes this updated value and proceeds in other processing operations, which may involve or impact memory surface, or primitive, 105. In this way, the CPU application 101 and GPU context 102 (executed by GPU 84) can be synchronized, which is a nonlimiting example of top level data synchronization.

Figure 3:
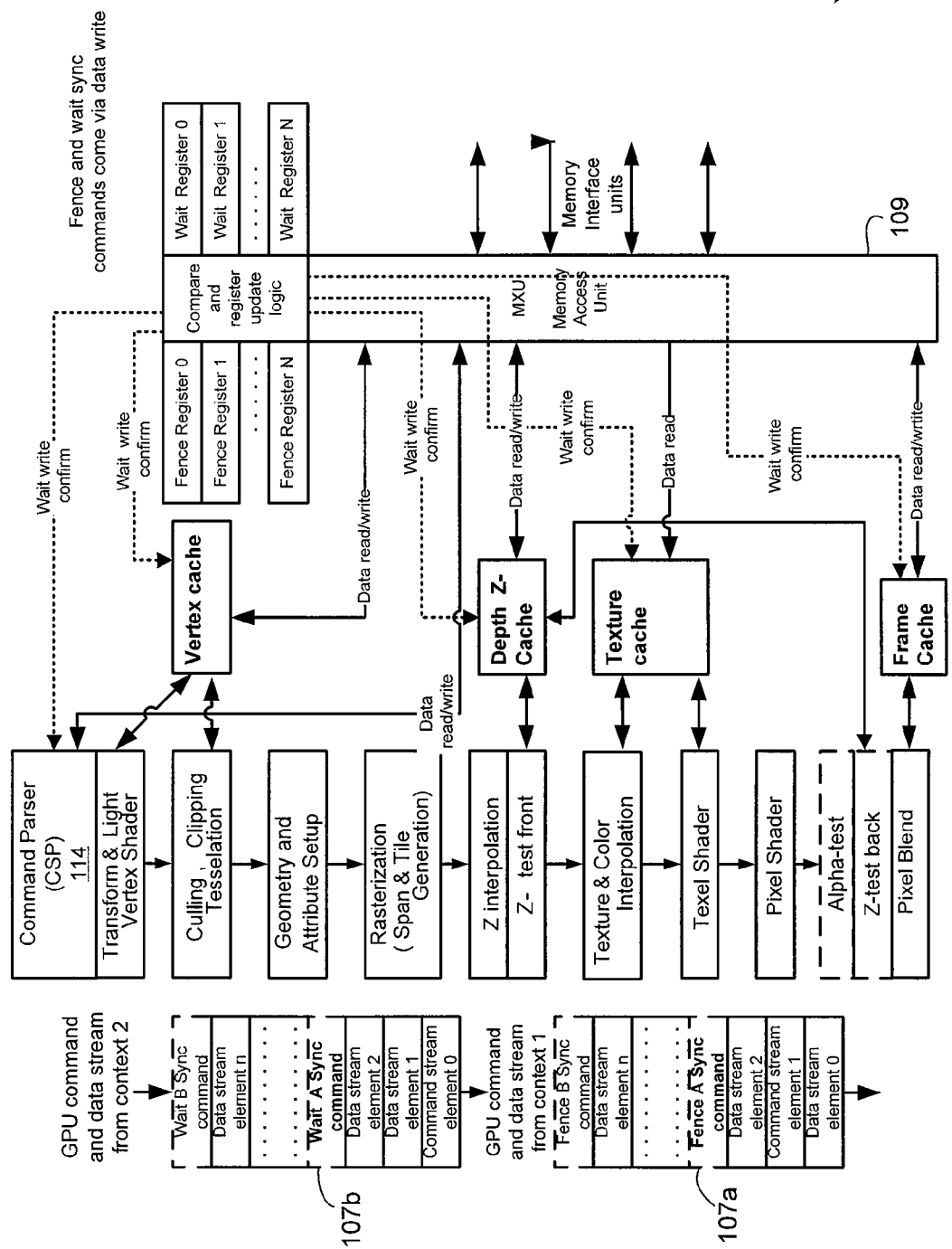
FIG. 3 is a diagram of a GPU graphics pipeline that may exist in the GPU of FIG. 1 and may comprise a mix of fixed function and programmable units coupled to each other via multiple FIFOs that communicate different data structures.

FIG. 3 is a diagram of GPU graphics pipeline 108 that may exist in the GPU of FIG. 1 and may comprise a mix of fixed function and programmable units coupled to each other via multiple FIFOs that communicate different data structures. Synchronization of the GPU graphics pipeline 108 may therefore constitute a nontrivial task due to the multiple type blocks that do not have merely one input or one output. Thus, in attempting to synchronize a GPU graphics pipeline 108 of FIG. 3, the different types of data flows should be acknowledged so as to maintain sequential order of graphics primitive rendering as well as timing synchronization among 2D, 3D, video, and other channels of a modern GPU.

As a nonlimiting example, medium level synchronization may be accomplished between multiple GPU contexts, such as contexts 1 and 2 of FIG. 3, as the respective GPU contexts move through the GPU graphics pipeline 108. A fence synchronization command "A" (reference 107*a*) in a context 1 may be written to a predetermined logical location, such as a memory access unit ("MXU") 109 that is followed, in this nonlimiting example, by a wait synchronization command "A" (reference 107*b*) in context 2 moving through the GPU graphics pipeline 108 behind context 1.

By causing data associated with each of the fence and wait commands 107*a*, 107*b* to be written to the MXU 109 (in this nonlimiting example), a GPU graphics pipeline component may wait for data associated with context 1 to be processed to a designated point so that further and related processing can occur at a higher logical point in the GPU graphics pipeline 108 on data associated with context 2. In this way, GPU graphics pipeline 108 is able to implement a medium level-type of data synchronization between two disparate GPU contexts. For more information about internal fence and wait synchronization commands, please refer to U.S. patent application Ser. No. 11/552,649 regarding same, which is hereby incorporated by reference.

Figure 4:
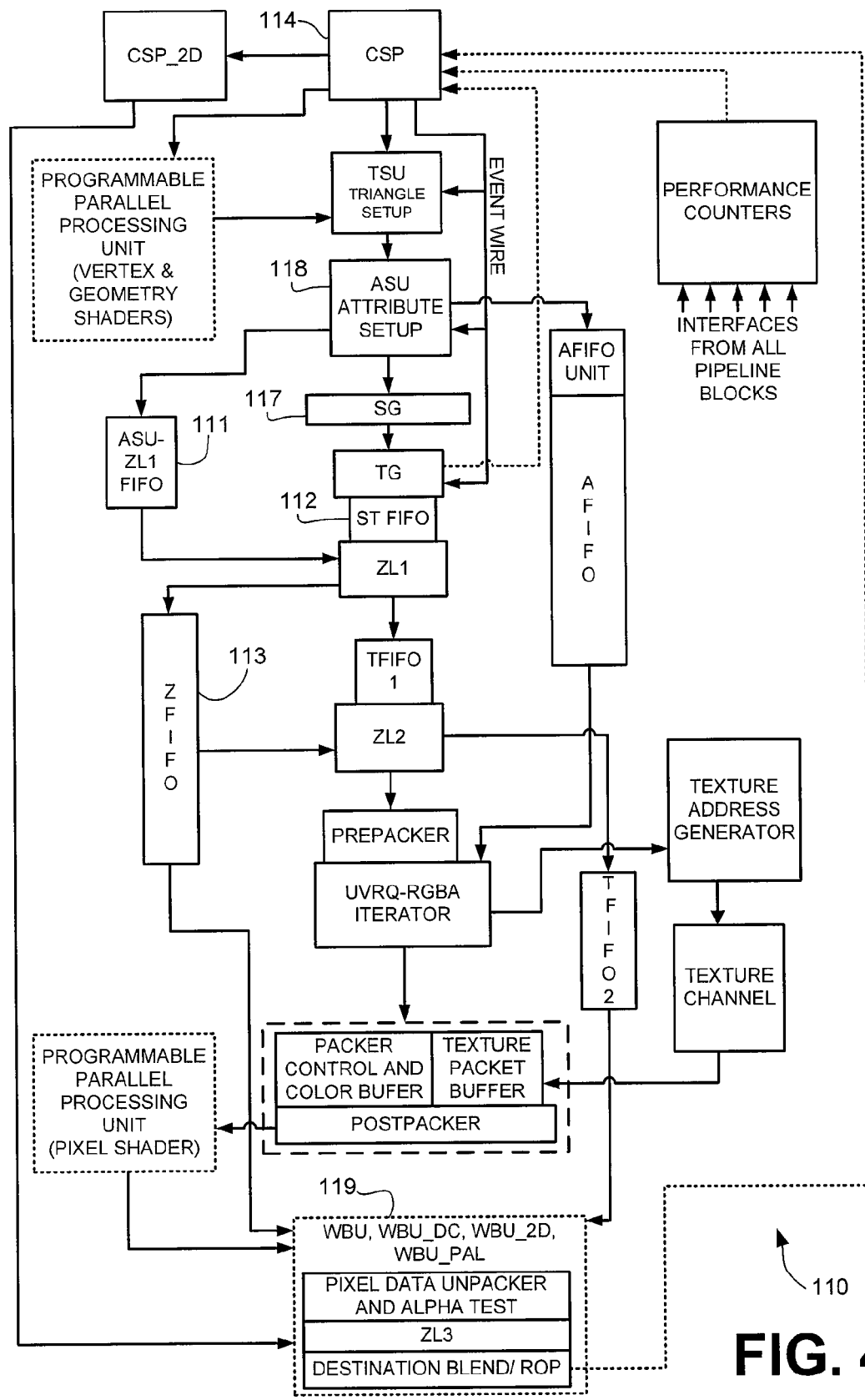
FIG. 4 is a diagram of a GPU graphics pipeline that is a further detailed nonlimiting exemplary representation of the graphics pipeline of FIG. 3.

FIG. 4 is a diagram of GPU graphics pipeline 110 that is a further detailed representation of the graphics pipeline 108 of FIG. 3. GPU graphics pipeline 110 contains a number of FIFOs, such as FIFOs 111, 112, and 113 (as nonlimiting examples), which enable synchronization commands to be communicated through the pipeline to, as a nonlimiting example, change GPU contexts (such as from context 1 to context 2 in FIG. 3). In this instance, a token, or other similar command, may be communicated through the pipeline 110, which causes components of the pipeline 110 to flush data associated with one context so as to process data associated with another context. For more information as to this nonlimiting example of low level synchronization in a GPU graphics pipeline 110, please refer to U.S. patent application Ser. No. 11/271,169, which is entitled, "Interruptible GPU And Method For Processing Multiple Contexts And Runlists," as filed on Nov. 10, 2005, and which is incorporated in its entirely herein by reference.

Command stream processor 114 (CSP) may be a predetermined component that is logically positioned on the top of GPU graphics pipeline 110 and provides control over the entire GPU graphics pipeline 110. CSP 114 executes the above-described high and medium level synchronization schemes and also generates a number of internal tokens for low level synchronization inside the GPU graphics pipeline, as also discussed above. CSP 114 may be configured with instructions that are relevant for each of the above-described levels of synchronization.

As a nonlimiting example, some of the instructions that may be configured in the CSP 114 for implementing each of the above-described synchronization levels are as follows:

| Command Name | Function | Synchronization Level |
|---|---|---|
| SKIP | May be placed in context position as placemarker when current context to be executed and not switched. | |
| Draw Primitive | Draw primitive command | N/A |
| Draw Indexed Primitive | Draw indexed command | N/A |
| 2D Repeat | 2D Polyline support command | N/A |
| 2D/MIT Operation | 2D data/Master Image Transfer command | N/A |
| 2D Host Data | Header command for 2D data block from host | N/A |
| Internal WAIT (stall) | Synchronization of input stream processing with display scan and wait mask update | Medium level synchronization - Stall of input parsing until selected display sync signal or wait mask (counter) set |
| Check-Surface-Fault | High level sync virtual memory mechanism support command | High level synchronization - Switch to another context if surface not paged in |
| Command DMA | Stream buffer pointer command | N/A |
| Set Register | Set GPU registers in particular block(s) command or restore all | May require sync with preceding save |
| Save States | Save GPU state registers in the memory | High level |
| Run List Update | Update active GPU context list (Not a stream command) | High level |
| Enable Context Switch | Enable GPU exceptions/interrupts | High level |
| 1BPP Operation | 1-BPP engine command | N/A |
| Internal Sync | Medium level synchronization command | Medium level synchronization - Stall particular block in access to the memory to prevent RAW hazard |
| Trap | High level synchronization command | High level synchronization - Interrupt CPU and provide trap ID |
| Reset/Disable/Enable Counter Registers | Counter control command | N/A |
| Dump Status Registers | Counter dump command | N/A |
| Dx10-Query | High level synchronization Query command | High level synchronization - Input Stream parse control based on query registers value |
| Trigger | Cache-buffers control command | Medium and low level synchronization |
| Flip | Display sync command | High level synchronization - Display controller switch at the end of frame rendering |
| Longhorn Wait | High level sync command | High level synchronization - Wait on the external counter in the memory |

-continued

| Command Name | Function | Synchronization Level |
|---|---|---|
| Longhorn Signal | High level sync command | High level synchronization - Increment external sync counter in the memory |
| Position | Internal GPU command for tracing DMA buffer parsing | N/A |
| End of (Sync) Command | Low-level GPU pipeline sync command (token) | Low level synchronization - Multipurpose internally generated token for low level synchronization |

For a number of these commands implemented by the CSP 114, which are discussed in more detail below, the following constitutes the CSP 114 synchronization command format:

| Command | DW 0 [31:0] | DW 1 [63:31] | DW 2 [95:64] | DW 3 [127:96] | Sync level |
|---|---|---|---|---|---|
| CheckFault | Opcode | Base address 1 | Base address 2 | Base address 3 | High |
| Trap | Opcode | Trap ID | | | High |
| Query | Opcode | Address | | | High |
| Intern Sync | Opcode | Address | Data low | Data high | Medium |
| LH Signal | Opcode | Address | | | High |
| LH Wait | Opcode | Address | | | High |
| Flip | Opcode | | | | High |
| Intern Wait | Opcode | | | | Medium |
| Trigger | Opcode | Base address | Address mask | | Medium-Low |
| 1F - Sync | Opcode | | | | Low |

Opcode—operation code

As recited above, the CheckSurfaceFault (or CheckFault) command provides high level synchronization in terms of checking availability of all surfaces in virtual memory (VM) for a particular GPU context. This command may generally be configured in the beginning of a context that is executed by the GPU graphics pipeline 110. If some surfaces associated with the context are not available, the CheckSurfaceFault command may cause a VM mechanism to page the surfaces. In that case, the current context may be interrupted and switched so that another context is executed while the VM mechanism pages the surfaces. The CSP 114 cooperates with MXU (Memory Access Unit) 109, which supports the VM mechanism and generates interrupts for the processing unit 16 (or other CPU) to engage the VM mechanism.

Figure 5:
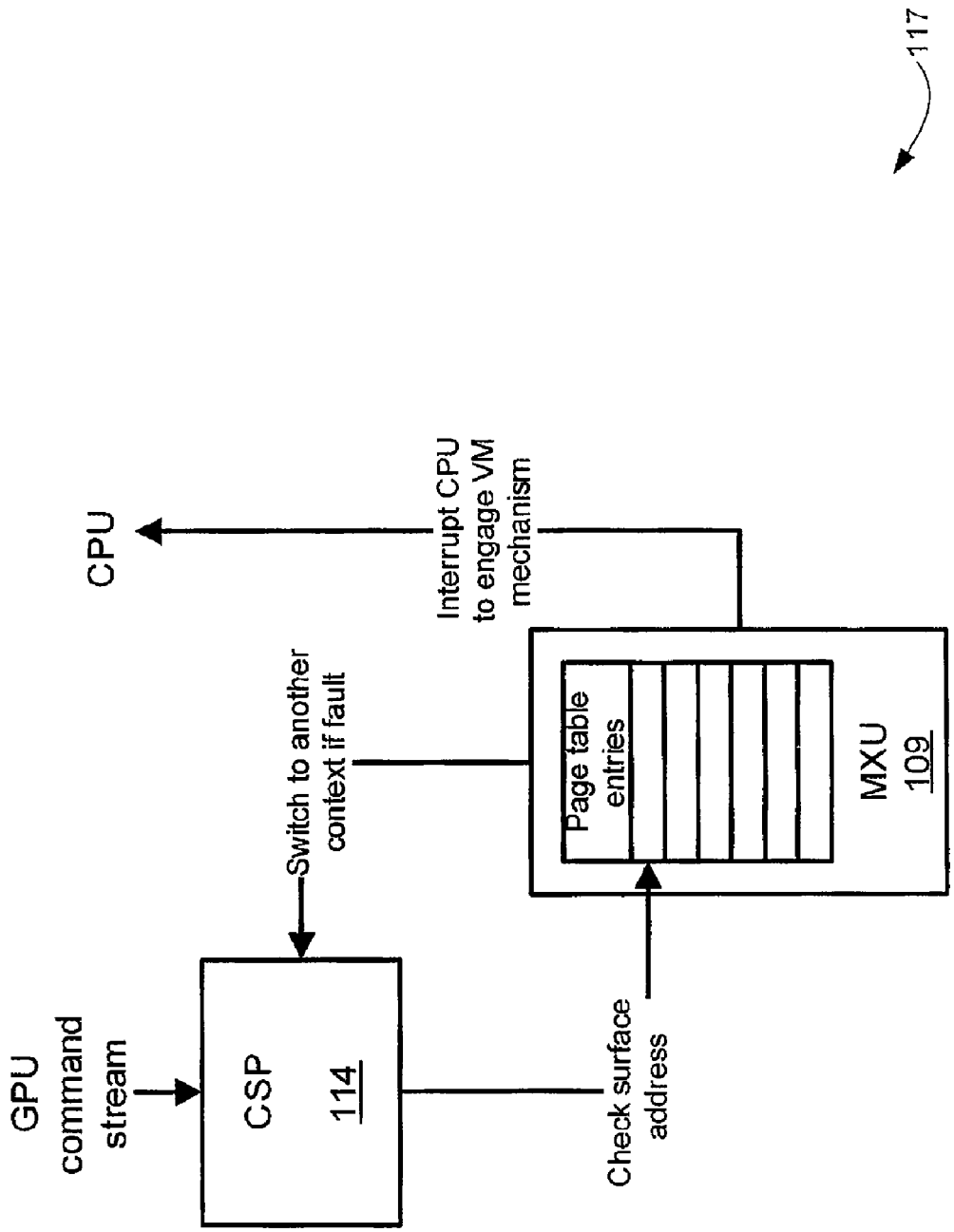
FIG. 5 is a diagram of a portion of the CSP of FIG. 4 depicting functional operation of a check surface fault command or instruction.

As shown in FIG. 5, which is a diagram 117 of a portion of the GPU graphics pipeline 110 of FIG. 4, CSP 114 may receive a GPU command stream. In an effort to determine the availability of surfaces related to a particular GPU context associated with the GPU command stream, CSP 114 may check the surface address in the page table entry registry of the MXU 109.

As discussed above, if some surfaces associated with the context are not available, the CheckSurfaceFault command may cause the MXU 109 to page the surfaces in videomemory or main memory. In this instance, the MXU 109 may interrupt the CPU (processing unit 16 of FIG. 1) to obtain the unavailable surfaces. Also, the MXU 109 may communicate a command back to the CSP 114 (as shown in FIG. 5) to interrupt the context lacking the surfaces being obtained, which may lead the CSP 114 to temporarily switch to another context. Thus, the CheckSurfaceFault command enables the CSP 114 for move to other contexts ready for processing, which effectively increases the overall efficiency and speed of the GPU graphics pipeline 110.

Also referenced above is a trap instruction. A trap is an instruction that may generate a CPU interrupt when processed by the GPU 84 through a component of the GPU graphics pipeline 110, such as a write back unit component 119, as shown at the bottom of the GPU graphics pipeline 110 in FIG. 4. More specifically, the trap command may be used for notification of CPU programs about the end of processing of a command or data batch in GPU 84 when it reaches last pipeline stage in GPU.

Figure 6:
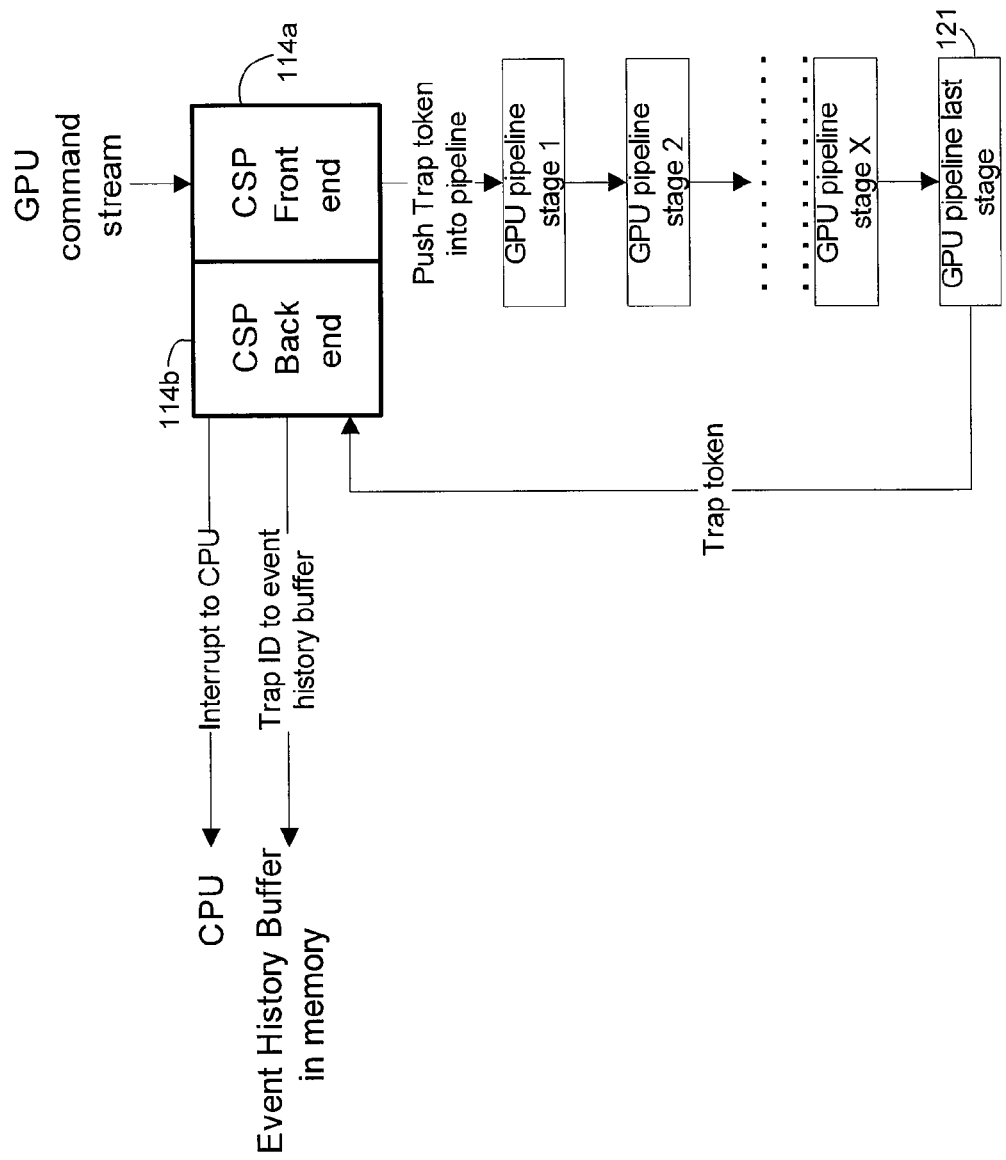
FIG. 6 is a diagram of a portion of the CSP of FIG. 4 depicting functional operation of a trap command or instruction.

FIG. 6 is a diagram 119 of a portion of the GPU graphics pipeline 110 of FIG. 4 depicting functional operation of a trap command. In this nonlimiting example of FIG. 6, the CSP 114 may be configured with a front-end portion 114a (a first portion) and a back-end portion 114b (a second portion). The CSP front-end portion 114a may receive the GPU command stream, as shown in FIG. 6.

As data and commands are pushed from the CSP front-end portion 114a into the GPU graphics pipeline 110, as shown in FIG. 6, the CSP front end portion 114a may insert a trap token (or similar command or identifier) thereafter to signify the end of the data and/or commands. As discussed above, when the end of the processing of a command or data batch is accomplished by one of or even the last processing block in the GPU graphics pipeline 110, that block (or component, as one of ordinary skill would know), such as GPU pipeline last stage 121, may communicate receive of the trap token back to the CSP 114, but to the back-end portion 114b.

The CSP back-end portion 114b may notify the CPU (processing unit 16 of FIG. 1). The CSP back-end portion 114b may also write a Trap ID (or other identification message) associated with the trap token to an event history buffer in memory 86, as shown in FIG. 6, for future reference.

Figure 7:
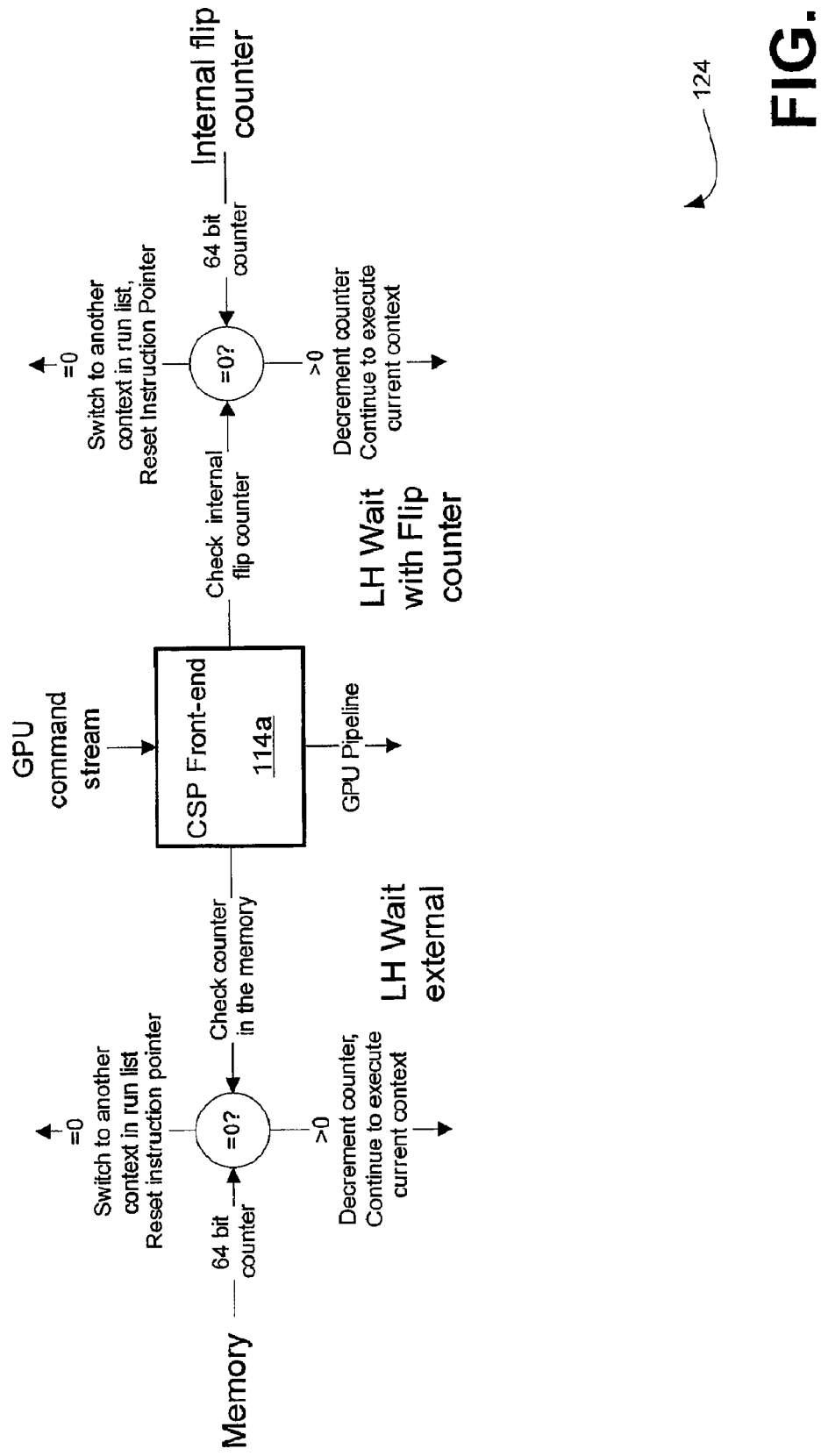
FIG. 7 is a diagram of a portion of the CSP of FIG. 4 depicting functional operation of a wait command or instruction.

A wait instruction is an instruction that may be inserted in a DMA stream to inform the CSP 114 that it should inspect the value of a specified counter, which in this nonlimiting example may be a 64-bit counter. FIG. 7 is a diagram 124 of the CSP front-end portion 114a of FIG. 6, which is a portion of CSP 114 of FIG. 4.

If the aforementioned counter has a non-zero value, as a nonlimiting example, the CSP 114 should decrement the counter and continue executing the current GPU context. However, if the value of the counter is zero (0), as a nonlimiting example, the CSP 114 may reset an instruction pointer of a current GPU context to position before the wait instruction and switch to the next context in a run list, which may be a set of contexts to be executed by the GPU 84. When a GPU context needs to stop on a wait instruction and is later rescheduled, the CSP 114 may re-execute the wait instruction, since it is possible that the wait condition is not satisfied.

In FIG. 7, if a counter, such as may be designated as an internal flip counter (FC), is equal to one, or is at least greater than zero (or some other threshold value), then the CSP front-end portion 114a may execute on the internal flip counter in GPU 84 instead of an external memory location, such as in memory 86. Specifically, the flip counter may be decremented and the current context may continue to be executed. However, if the counter, upon receiving a wait instruction, is equal to zero, as a nonlimiting example, the CSP front-end portion 114a may switch to another context in a run list of contexts and may also reset an instruction pointer for the new context, which may indicate a current instruction to execute.

Instead of checking an internal flip counter, the wait instruction may cause the CSP front-end portion 114a to check a counter in memory 86. Specifically, a counter in memory 86 may be checked and decremented if not equal to zero (in this nonlimiting example) in similar fashion than as described above. At least one difference, however, when an external wait command is implemented is that an external memory access operation results, whereas the internal flip counter may be one that is retained locally to the GPU 84, thereby potentially resulting in a faster operation.

The command for a wait instruction may take the following form:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Reserved | | | | | | | | | | | | | | | |
| 31 | 30 | 29 | 28 | 27 | 26 | 25 | 24 | 23 | 22 | 21 | 20 | 19 | 18 | 17 | 16 |
| 0 | 1 | 1 | 0 | 0 | 1 | DWF | | Reserved | | | | | | | FC |

Bit 16      FC—Flip Counter
               0 = the command operates external 64-bit counter by the specified address
               1 = the command operates the internal counter
Bits 25-24    DWF (num of DWORD following). DWF = 00 or 01.
Address [31:0]

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Address LSBs | | | | | | | | | | | | | reserved | | TD |
| 31 | 30 | 29 | 28 | 27 | 26 | 25 | 24 | 23 | 22 | 21 | 20 | 19 | 18 | 17 | 16 |
| Address MSBs | | | | | | | | | | | | | | | |

Figure 8:
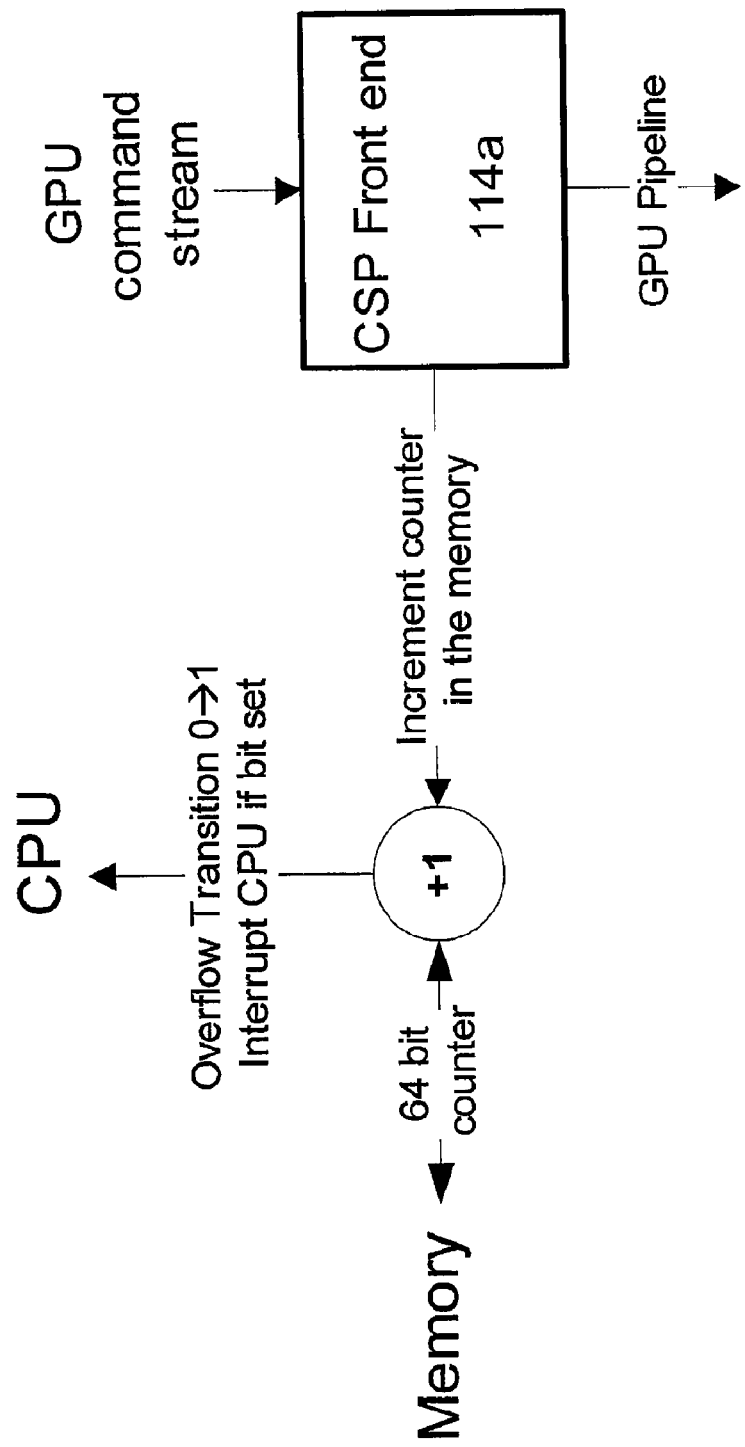
FIG. 8 is a diagram of a portion of the CSP of FIG. 4 depicting functional operation a signal command or instruction.

Bit 0       TD - disable virtual to physical address translation
              0 = the address is to be translated by the MXU
              1 = the MXU should not translate the address In addition to a wait operation, the CSP 114 may be configured to engage in a signal operation. FIG. 8 is a diagram 130 of a portion of the CSP 114 of FIG. 4 as it may be configured to engage in implementing a signal instruction.

A signal instruction may be inserted in a data stream to inform the GPU 84 that it should update the value of a designated 64-bit counter located by a specified address. The CSP front-end portion 114a may implement receive the signal instruction in the GPU command stream, as shown in FIG. 8. Upon receipt of the instruction, the CSP front-end portion 114a may increase the value of the 64-bit count counter by one (or by some other predetermined amount). As shown in FIG. 8, the counter may logically reside in video memory 86 (FIG. 1).

In this nonlimiting example, the CSP front-end portion 114a may ignore the potential overflow during the addition. If an interrupt bit (or another predetermined bit) is set in the instruction, the CSP 114 front-end portion 114a may also send a CPU interrupt to the processing unit 16 (which is shown in FIG. 8 as the CPU). However, in at least one nonlimiting example, the CPU interrupt may be sent if the new (incremented) counter value is "1", i.e. wherein a value transition from 0 to 1 just occurred (or some other particular first value to a particular second value). The signal instruction received by the CSP front-end portion 114a may have one parameter, which may be the virtual address of the counter that should be updated. Nevertheless, the counter size in this nonlimiting example may be 64 bits.

The command for a signal instruction may take the following form:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| INT | Reserved | | | | | | | | | | | | | | |
| 31 | 30 | 29 | 28 | 27 | 26 | 25 | 24 | 23 | 22 | 21 | 20 | 19 | 18 | 17 | 16 |
| 0 | 1 | 1 | 0 | 0 | 1 | DWF | | Reserved | | | | | | | |

Bit 15      INT Interrupt on 0→1 transition; this way the signal instruction will be implemented, sending an interrupt request when the counter value changes from 0 to 1
Bits 25-24    DWF (num of DWORD following). DWF = 1.
Address [31:0]

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Address LSBs | | | | | | | | | | | | | reserved | | TD |
| 31 | 30 | 29 | 28 | 27 | 26 | 25 | 24 | 23 | 22 | 21 | 20 | 19 | 18 | 17 | 16 |
| Address MSBs | | | | | | | | | | | | | | | |

Figure 9:
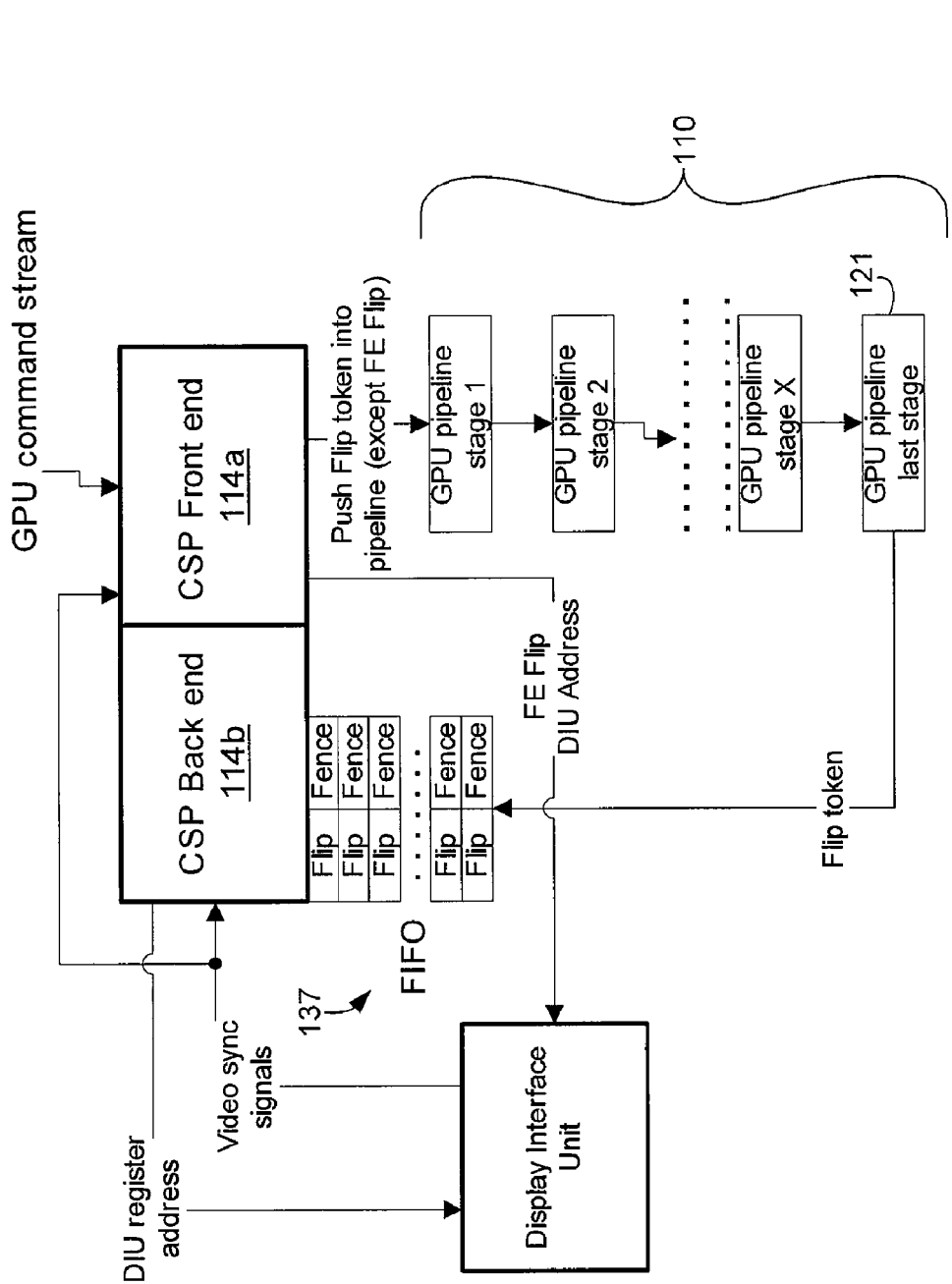
FIG. 9 is a diagram of a portion of the CSP of FIG. 4 depicting functional operation a flip command or instruction.

Bit 0        TD - disable translate
               0 = the address is to be translated by the MXU 109
               1 = the MXU 109 should not translate the address
Bits 31-3     Address 64-bit aligned Another instruction implemented in the CSP 114 of FIG. 4 is a flip instruction. FIG. 9 is a diagram 134 of a portion of the CSP 114 of FIG. 4 that may be configured for implementing a flip command or instruction. The flip instruction may be configured to set up a display interface unit (DIU) register upon receipt by the CSP 114 of a predetermined synchronization signal. The flip instruction (or command) may be configured to pass through the GPU graphics pipeline 110 back to CSP back-end portion 114b. The CSP 114 may wait for the specified synchronization signal to arrive from the DIU. After receipt, the CSP 114 may program the specified DIU registers with the command's data.

The flip instruction may take the following form:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| INT | FE | Flip ID | | | | | | | HS2 | PS1 | PS2 | HS1 | SS1 | SS2 | SHOW |
| 31 | 30 | 29 | 28 | 27 | 26 | 25 | 24 | 23 | 22 | 21 | 20 | 19 | 18 | 17 | 16 |
| 0 | 1 | 1 | 0 | 0 | 1 | DWF | | ADDR | | | | | | | |

Bit 0       SHOW-The frame is shown for back-end Flip operations
Bit 1       SS2 VERTICAL SYNC
Bit 2       SS1 VERTICAL SYNC
Bit 3       HS1 HORIZONTAL SYNC
Bit 4       PS2 VERTICAL SYNC
Bit 5       PS1 VERTICAL SYNC
Bit 6       HS2 HORIZONTAL SYNC
Bits 13-7    Flip ID - for front end flip operations. The Flip ID may be used by the driver when parsing the event history buffer
Bit 14      FE—Front End. Distinguishes Front end and back end flip commands.
Bit 15      INT - for front end flip operations. The CSP sends an interrupt request to the CPU on the flip's execution
Bits 23-18   ADDR - The starting address of the first DIU register to program
Bits 25-24   DWF - the number of registers to program (up to 3, 1 for a FE flip)

To prevent stalling the last GPU pipeline last stage unit 121, as shown in FIG. 9, the CSP back-end portion 114b may be configured with a retaining buffer 137 (which may be a FIFO) to store a predetermined number of pairs of flip+fence, where a fence command or instruction may be used to separate contexts, instruction types, data types, etc.

A waiting for sync flip command (or instruction) may be stored in the retaining buffer 137. If a fence or other predetermined command immediately follows the flip instruction, the fence command may be stacked together with the flip instruction in the retaining buffer 137. All subsequent flip+fence pairs may also be stacked in the retaining buffer 137.

The CSP 114 may invalidate earlier flip instructions with the same ADDR value, as shown in the nonlimiting exemplary addressing format above, that is, if there are any stored in the retaining buffer 137. To prevent the CSP 114 from invalidating earlier flip instructions, the SHOW bit, as shown above, may be set in a command. A flip instruction with SHOW bit set (bit 0) would not be dropped by the CSP 114.

When a flip command or instruction is executed, a flip counter may be incremented. The flip counter may be decremented by a complimentary wait command or instruction, as described above.

Another command that may be implemented by the CSP 114 is an internal wait (or stall) instruction. An internal stall instruction may be configured to stall the CSP 114 while waiting for occurrence of a display retrace signals coming from DIU with a preliminary check of the flip counter, or clearing wait mask preliminary set by a trigger instruction, as shown in FIG. 9. Whenever any of the such signals arrives at the CSP 114, the CSP 114 may then continue with the GPU command stream.

Figure 10:
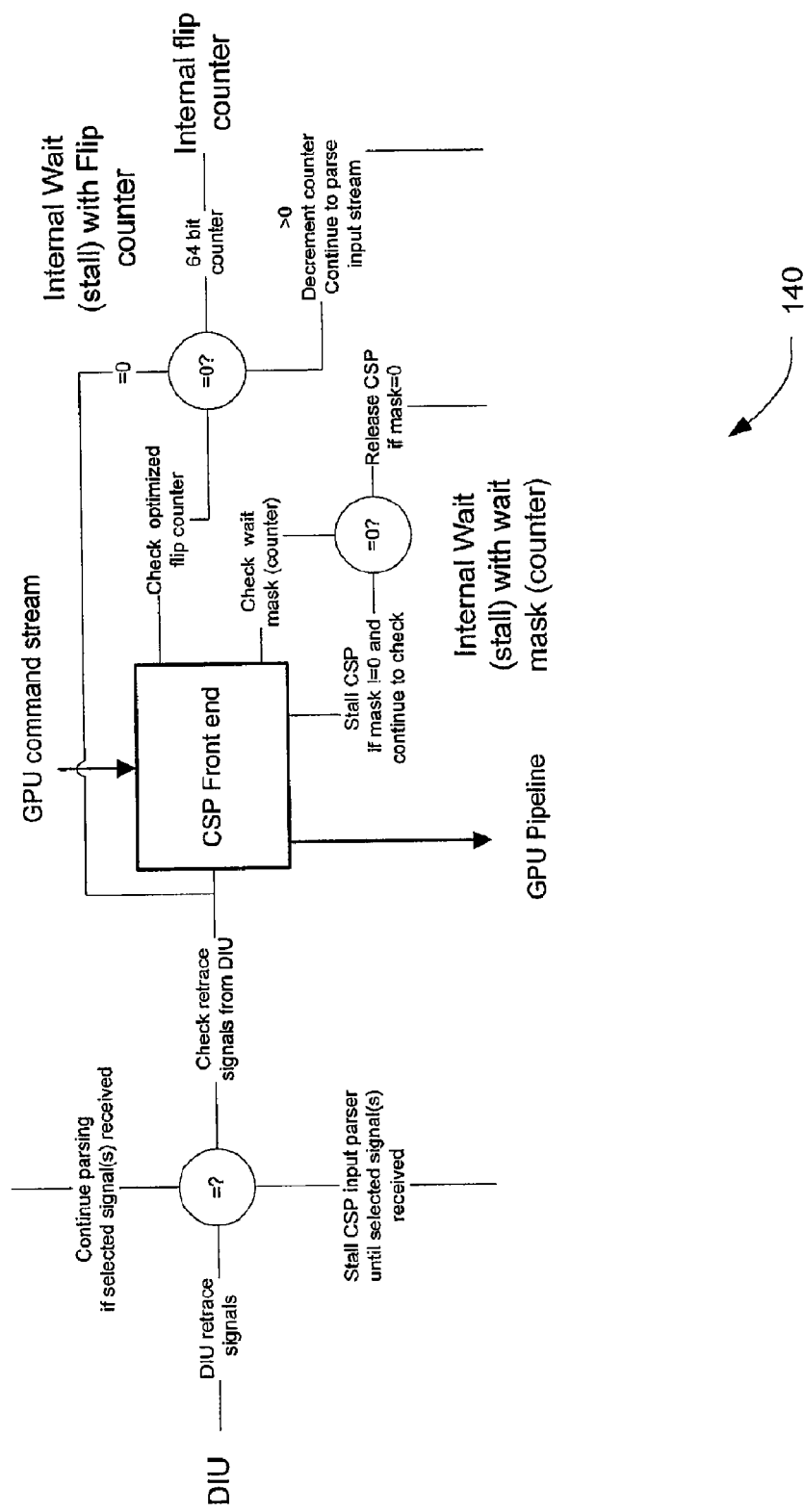
FIG. 10 is a diagram of a portion of the CSP of FIG. 4 depicting functional operation an internal wait (or stall) command or instruction.

FIG. 10 is a diagram 140 of the CSP 114 that may be configured for implementing an internal stall instruction with a wait mask, or counter. An internal stall instruction may be configured to stall the CSP 114 while waiting for the occurrence of a display retrace signal coming from a display interface unit, as shown above in FIG. 9. As the GPU command stream may come into the CSP front-end portion 114a, the CSP front-end portion 114a any check a flip counter to determine if the flip counter is zero (0) or some other predefined value. The flip counter may be an internal flip counter to the CSP 114 or elsewhere in the GPU 84 that is configured as a 64-bit counter.

Nevertheless, if the flip counter is not equal to zero (0), as shown in FIG. 10, then the CSP front-end portion 114a may decrement the counter and proceed in implementing the next instruction in the GPU command stream. Stated another way, in this nonlimiting exemplary instance, no internal stall is activated.

However, if the flip counter is zero (0), then the CSP front-end portion 114a will wait for occurrence of a display retrace signal (or other signal) from the display interface unit (or other predefined unit). More specifically, and as shown in FIG. 10, the CSP front-end portion 114a will check for a display retrace signal from the display interface unit. If there is no retrace signal received by the CSP front-end portion 114a from the display interface unit, the CSP front-end portion will stall until the display retrace signal is received from the display interface unit. When the display retrace signal is received, then the CSP front-end portion 114a will continue operations, such as execution of a next instruction in the GPU command stream.

The form of an internal stall instruction, as may be received by the CSP front-end portion 114a may be configured as follows:

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| reserved | | | | | | PG | AES | SPP | 2D | PS1 | PS2 | HS1 | SS1 | SS2 | HS2 |
| 31 | 30 | 29 | 28 | 27 | 26 | 25 | 24 | 23 | 22 | 21 | 20 | 19 | 18 | 17 | 16 |
| P | 0 | 0 | 1 | 1 | 0 | DWF | | reserved | | | | | WM | Res | FC |

Bit 0    HS2 horizontal sync
Bit 1    SS2 vertical sync
Bit 2    SS1 vertical sync
Bit 3    HS1 horizontal sync
Bit 4    PS2 vertical sync
Bit 5    PS1 vertical sync
Bit 6    2D - 2D FE idle
Bit 7    SPP - SPP idle
Bit 8    AES - AES idle
Bit 9    PG - Paging idle
Flip counter status stall:
Bit 16    FC—Flip Counter (see Optimized Flip Support for details)
    0 = Not sensitive to status of Optimized Flip Counter
    1 = Stall CSP FE if Flip Counter = 0 and wait until status change; otherwise it will decrement the counter and proceed.
Wait flag (mask) stall or complete pipeline flush command.
Bit 18    WM—Wait Mask
    0 = do not wait for the wait mask to become 0
    1 = wait for the wait mask to become 0 (see CSP wait mask)
Bits 25-24    DWF = 00

The CSP wait mask, which in this nonlimiting example is represented at bit 18, enables the software driver to synchronize for the CSP 114 to receive information from the GPU graphics pipeline 110. Setting and clearing the wait mask can be, as a nonlimiting example, accomplished through a trigger command communicated down the GPU graphics pipeline 110 and back to the CSP 114.

Figure 11:
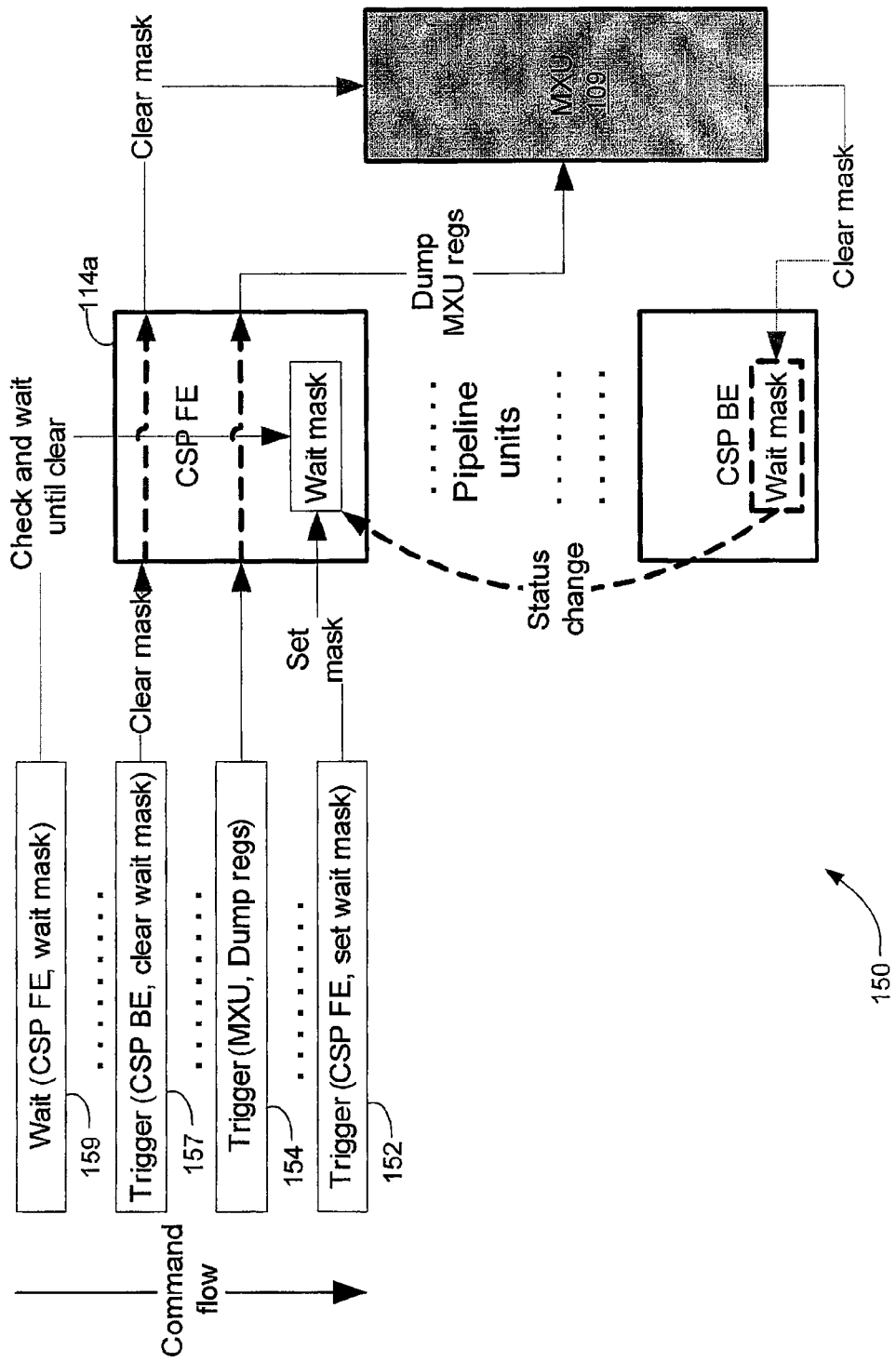
FIG. 11 is a diagram of a portion of the CSP of FIG. 4 as configured to implement an internal wait with a wait mask.

FIG. 11 is a diagram of a nonlimiting example of using a CSP wait mask wherein the CSP 114 in this instance is waiting for the MXU 109 to send all its registers back to a CSP save buffer. As a nonlimiting example, a CSP wait mask bit or counter (such as bit 18) may be set by a CSP trigger "set wait" command, as discussed above. Thereafter, a MXU trigger "dump regs" command (which is a nonlimiting exemplary name) may be sent to the MXU 109. A CSP "back end" trigger "clear wait" command may thereafter be sent through the MXU 109 to clear the designated bit (or decrement the counter), which in this nonlimiting example may be bit 18.

Thereafter, a CSP internal wait (or stall) command may issued to wait for the CSP wait mask (or counter) to be cleared. This command sequence may cause the CSP 114 to suspend parsing the input command stream until all MXU 109 registers are received and the CSP trigger token is passed through the MXU 109. However, one of ordinary skill in the art would know that this example with MXU 109 is nonlimiting, as one or more other blocks or components of the GPU graphics pipeline 110 could be used as well.

As shown in FIG. 11, a nonlimiting exemplary programming sequence 150 for implementing an internal wait mask may be configured in the GPU graphics pipeline of FIG. 4. A pipeline block to be synchronized with CSP front-end portion 114a may be defined, which may lead to the defined block finishing some action before the CSP front-end portion 114a may continue command parsing. Thus, as shown in FIG. 11, trigger command 152 may be sent to the CSP front-end portion 114a. In this nonlimiting example, the trigger command 152 causes a wait mask bit (or counter) (such as bit 18 discussed above) to be set to a predetermined state. In this nonlimiting example, a MXU trigger "dump regs" command 154 may be sent to the MXU 109 to cause a certain action. More specifically, the CSP front-end portion 114a may send any group of commands defining the action of any particular block based on the receipt and construct of command 154, which in this instance pertains to MXU 109.

A subsequent trigger command 157 may be received by the CSP front-end portion 114a and forwarded to the MXU 109 and on to the CSP back end portion 114b. This command 157 may contain a clear wait mask (or decrement) option, as shown in FIG. 11. MXU 109, upon receipt of this trigger command relating to the clearing of the wait mask bit (which was previously set by command 152), is forwarded on to CSP back-end portion 114b. CSP 114 may be engaged in a waiting operation upon receipt of the trigger command 152, which set the wait mask bit 18 until receipt of the wait clear command 157, as MXU 109 may not forward the wait clear command 157 until the trigger "dump regs" command 154 is completed by MXU 109.

Thus, MXU 109 may ultimately forward the wait clear command 157 on to a wait mask register at CSP back-end portion 114b, which subsequently correlates to a corresponding register in CSP front-end portion 114a. In so doing, CSP 114 will effectively suspend parsing the input command stream until all MXU 109 registers are received and the CSP Trigger token (in this instance, wait clear command 157) is passed through the MXU 109.

As indicated with respect to the wait (or stall) instruction, the CSP may implement a trigger function or instruction. The trigger instruction may cause the CSP 114 to initiate a preload, invalidate, flush, drain, clear, autoclear operation, or other predetermined actions on various blocks or units in the GPU graphics pipeline 110 of FIG. 4. The following bit pattern is but one nonlimiting example of how the CSP 114 may trigger an event (i.e., preload, invalidate, flush, etc.) in one or more of the components of the GPU graphics pipeline 110:

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| r | Block ID | | | | | Res. | | Trigger bits | | | | | | | |
| 31 | 30 | 29 | 28 | 27 | 26 | 25 | 24 | 23 | 22 | 21 | 20 | 19 | 18 | 17 | 16 |
| P | 1 | 0 | 1 | 0 | 1 | DWF | | Res. | POS | BE | Auxiliary Block ID | | | | |

Bits 7-0 Trigger bits; specify an operation to be implemented or executed.

Bits 14:10 Block ID; identify the particular block in GPU graphics pipeline 110 for receipt of the trigger command for the predetermined action.

Bits 20:16 Auxiliary Block ID. These bits identify an alternate block in the graphics pipeline 100. This information may relate to a block ID to send the command to in the event that bit 21, BE, is set to 1 If BE (bit 21)=0, then the Auxiliary Block ID field of bits may be ignored.

Bit 21-BE (back-end). This bit corresponds to a CSP "Back end" trigger, which may be sent through the GPU graphics pipeline 110 along with the Auxiliary Block ID (bits 20:16) back to the CSP for synchronization purposes.

Bit 22-POS (position). This bit relates to whether the CSP 114 should send a position command down the GPU graphics pipeline 110 for the corresponding trigger command.

Bits 25-24—DWF (double words). The field specifies how many "range" information use depends on the recipient block for the trigger command, as some blocks may call for more or fewer DWs.

This trigger command may be configured as a multifunctional internal buffer management and synchronization command that may, as a nonlimiting example, be directed a number of the units (or blocks) of the GPU graphics pipeline 110. The action of the trigger command in each unit of the graphics pipeline 110 can be defined by trigger bit mask [7:0], as discussed above. Plus, action in each of the potential recipient blocks might be different depending on functionality of that particular pipeline block in GPU graphics pipeline 110, such as CSP 114, MXU 109, SG (Shade Generator) 117, ASU (Attribute Setup Unit) 118, WBU (Write Back Unit) 119, as well as a host of other component blocks shown in FIG. 4 (as well as other blocks not shown in FIG. 4 but which one of ordinary skill in the art would know otherwise are included in GPU 84). Nevertheless, action in each block that receives a trigger command may vary depending on functionality of that block.

In at least one nonlimiting example, as discussed above, trigger commands may be directed to the CSP 114. In this instance, as discussed above for CSP-directed trigger commands, control bits POS [22] and backend BE [21] may be used, as discussed above, in combination with an auxiliary block ID [20:16].

As a nonlimiting example, the following table may describe a nonexclusive number of CSP 114 directed trigger command options:

| Trigger mask bit | Action nickname | Description and relation to other commands |
|---|---|---|
| Bit 1 | clear dirty | Sending the CSP trigger "clear dirty" may force the CSP 114 to mark all its shadow register buffer's contents as "clean". That may lead to the CSP 114 not flushing the "dirty" contents on a next command. This command may be used at the debug/verification stage to help minimizing the size of the dumps after the initial Restore All command. |
| Bit 2 | clear wait | Clear Wait mask |
| Bit 3 | set wait | Set Wait mask |
| Bit 4 | flush Q$ | The CSP Trigger "flush Q$" command is intended to flush all non-saved contents of the CSP query cache and save the contents of the query flags' memory to the specified location. The command is executed at the CSP FE only. There should always be the address of the location to save the predicated ID data in the command. |
| Bit 6 | load Qid | The CSP Trigger "load Qid" command is intended to have the previously stored contents of the query predicates' buffer loaded back to the CSP buffer. This command also requires DW[1] to be the address of the 512-bit aligned buffer where predicated were saved. |

Figure 12:
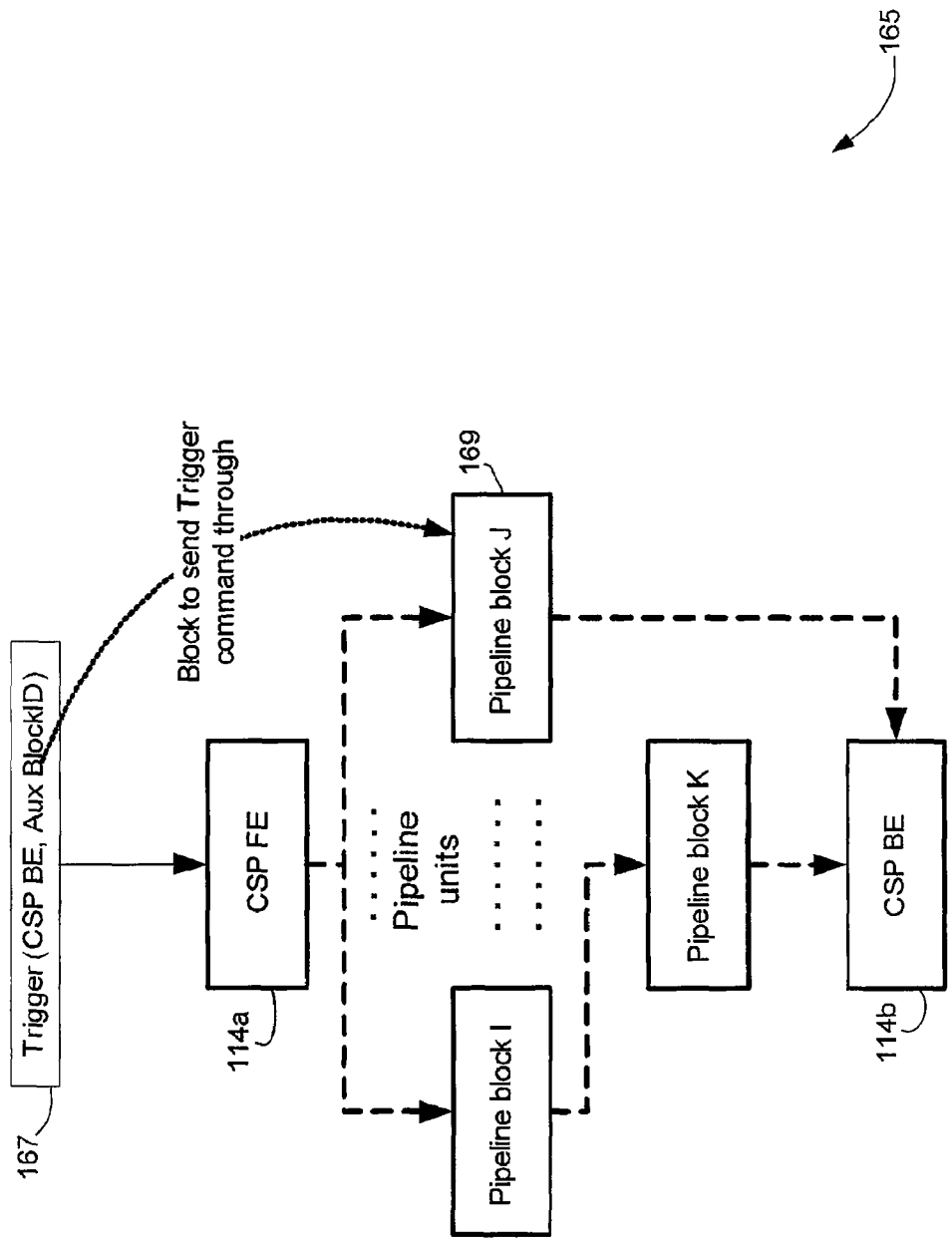
FIG. 12 is a diagram of a portion of the CSP of FIG. 4 depicting a nonlimiting exemplary operation of the CSP of FIG. 4 for CSP-directed trigger commands that are redirected by an auxiliary block ID to another block in the pipeline.

However, CSP 114 may also redirect the trigger command to the CSP back-end 114b via a particular pipeline block defined in the auxiliary block ID field, which in this nonlimiting example may be bits 20:16. FIG. 12 is a diagram 165 depicting a nonlimiting exemplary operation of the CSP 114 of FIG. 4 for CSP-directed trigger commands that are redirected by the CSP 114.

As shown in FIG. 12, CSP front-end portion 114a may forward the trigger command 167 onto the addressed recipient pipeline block J (reference numeral 169) in GPU graphics pipeline 110 of FIG. 4. In this nonlimiting example, pipeline block J would be identified to the CSP by identifying information found in bits 20:16 of the trigger command 167, which correspond to the auxiliary block ID.

The recipient pipeline block J (reference numeral 169), after receiving trigger command 167 and implementing the instructed action, which could include: marking cache contents invalid, flushing caches to memory, dumping predetermined registers, invalidating page tables, termination of certain requests, etc.—all as nonlimiting examples. Upon completion of the action specified by trigger command 167, the pipeline block J (reference number 169), as shown in FIG. 12, may communicate with CSP back-end portion 114b that the trigger has been implemented, which, as discussed above, may have been combined with a wait mask wherein the CSP 114 stalled from processing the command stream.

Figure 13:
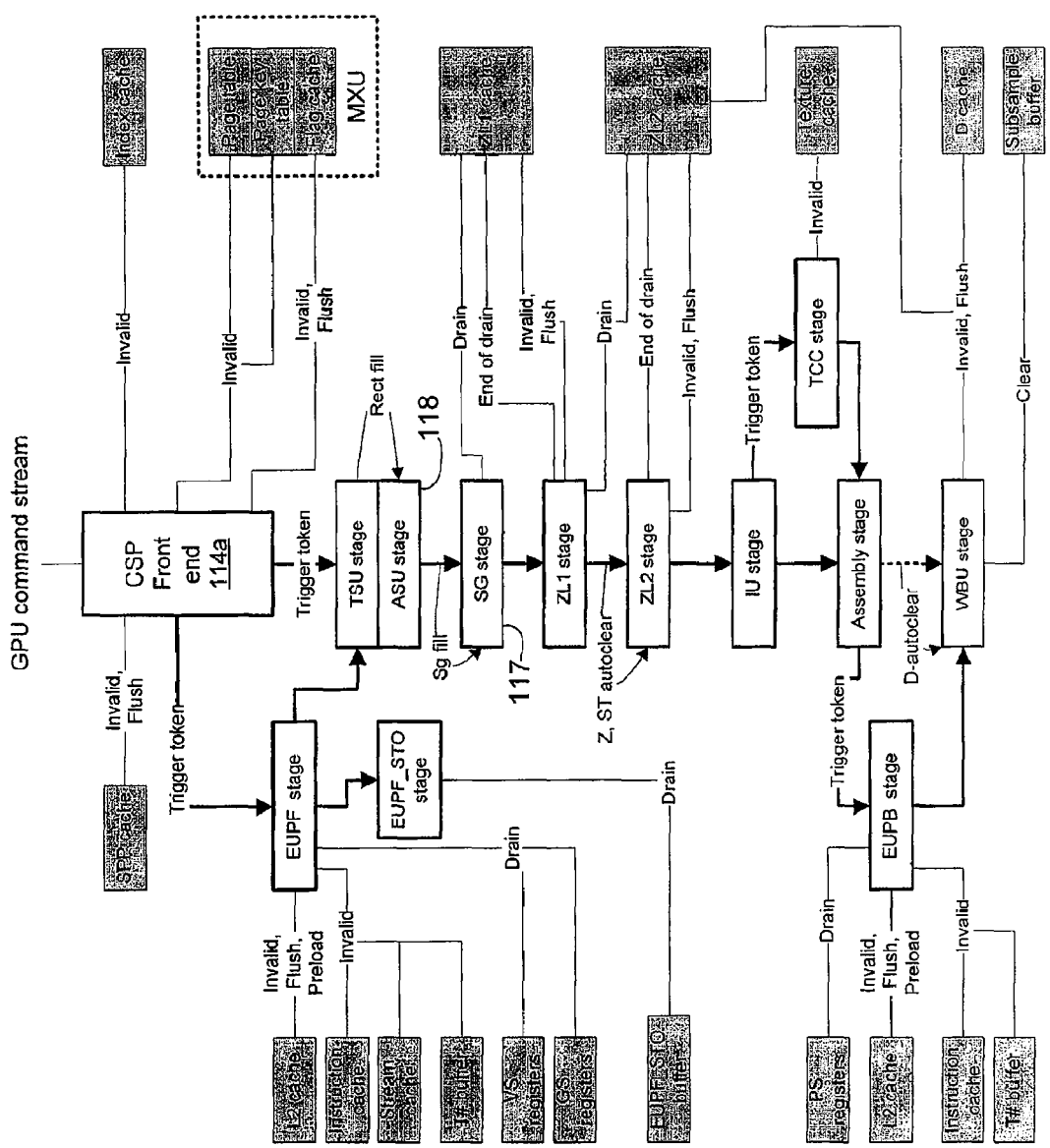
FIG. 13 is a diagram of a nonlimiting exemplary portion of a graphics pipeline of FIG. 1.

FIG. 13 is a nonlimiting exemplary diagram of a graphics pipeline configuration 175 that may comprise a portion of the GPU 84 of FIG. 1. More specifically, FIG. 13 depicts how the CSP front-end portion 114a may communicate trigger commands to various components of the graphics pipeline configuration 175, including, as a nonlimiting example, particular trigger commands to particular components.

FIG. 14 is a diagram 180 of a method to synchronize an application and a graphics pipeline. The method comprises receiving an application generated graphics processing unit (GPU) instruction in an input stream at a predetermined component of a graphics pipeline, as shown in step 182. The application generated GPU instruction may be inserted into the input stream in accordance with an application executed by a central processing unit (CPU), such as processing unit 16 of FIG. 1. The predetermined component may have a first portion coupled to a next component in the graphics pipeline and a second portion coupled by a plurality of feedback paths to a plurality of components of the graphics pipeline.

The method also comprises forwarding a GPU command associated with the application instruction from the first portion to at least one of the next component and another component coupled to the predetermined component, as shown in step 184. The method may further comprise receiving the GPU command associated with the application instruction at the at least one of the next component and the another component, the at least one of the next component and the another component executing a predetermined number of actions associated with the GPU command, as shown in step 186.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

The invention claimed is:

1. A method to synchronize an application and a graphics pipeline, comprising the steps of:
    receiving an application generated graphics processing unit (GPU) instruction in an input stream at a predetermined component of a graphics pipeline, the application generated GPU instruction being inserted into the input stream in accordance with an application executed by a central processing unit (CPU), the predetermined component having a first portion coupled to a next component in the graphics pipeline and a second portion coupled by a feedback path to a component of the graphics pipeline;
    forwarding a GPU command associated with the application generated GPU instruction from the first portion to at least one of the next component and another component coupled to the predetermined component;
    receiving the GPU command associated with the application generated GPU instruction at the at least one of the next component and the another component, the at least one of the next component and the another component executing a predetermined number of actions associated with the GPU command;
    wherein the application generated GPU instruction is a wait instruction, the wait instruction further comprising the steps of:
        recognizing at the first portion of the predetermined component the wait command in the input stream;
        checking a counter to determine if a value of the counter is greater than or equal to a threshold value;
        decrementing the counter if the value of the counter is greater than the threshold value and continuing to execute instructions associated with a current graphics context; and
        switching at the first portion of the predetermined component from the current graphics context to another graphics context if the value of the counter is equal to the threshold value; wherein the counter is a flip counter internal to a graphics processing unit containing the graphics pipeline.

2. The method of claim 1, wherein the application generated GPU instruction comprises:
    an operation code portion; and
    at least one double word portions containing at least one of identification information, address information, and data.

3. The method of claim 1, wherein each operation code and at least one double word portion is 32 bits.

4. The method of claim 1, wherein the application generated GPU instruction is a check surface fault instruction, the check surface fault instruction further comprising the steps of:
    communicating a GPU command from the predetermined component to a recipient component to check a virtual memory and determine the availability of all surfaces for a particular context to be executed in the graphics pipeline;
    interrupting the particular context at the predetermined component if the virtual memory lacks all surfaces for the particular context and switching to a new context; and
    generating an interrupt to retrieve all surfaces not contained in the virtual memory.

5. The method of claim 4, further comprising the steps of:
    resuming the interrupted particular context after all surfaces are retrieved in the virtual memory.

6. The method of claim 4, wherein the interrupt is communicated to the CPU.

7. The method of claim 4, wherein the recipient component is a memory access unit component.

8. The method of claim 4, further comprising the steps of:
    continuing execution of the particular context if the virtual memory contains all surfaces for the particular context upon communicating the command from the predetermined component to the recipient component.

9. The method of claim 1, wherein the application generated GPU instruction is a trap instruction, the trap instruction further comprising the steps of:
forwarding a trap token from the first portion of the predetermined component to the next component in the graphics pipeline, wherein the trap token is communicated through the graphics pipeline to a graphics pipeline last stage component;
communicating the trap token from the graphics pipeline last stage component to the second portion of the predetermined component via a feedback path; and
generating an interrupt message to the central processing unit associated with receipt of the trap token by the second portion of the predetermined component.

10. The method of claim 9, wherein the CPU upon receipt of the interrupt message recognizes receipt of the interrupt message in association with an end of processing in the graphics pipeline of a designated command or data.

11. The method of claim 9, further comprising the step of:
communicating an identification message associated with the trap token from the second portion of the predetermined component to a memory for storage.

12. The method of claim 1, wherein the counter is contained in a video memory external to a graphics processing unit containing the graphics pipeline.

13. The method of claim 1, wherein the counter is a 64-bit counter.

14. The method of claim 1, further comprising the steps of:
resetting an instruction pointer to a predetermined logical point when the first portion of the predetermined component switches from the current graphics context to another graphics context.

15. The method of claim 1, wherein the application generated GPU instruction is a flip instruction, the method further comprising the steps of:
sending a flip token from the first portion of the predetermined component to the next component in the graphics pipeline, wherein the flip token migrates through the graphics pipeline to a last stage component in the graphics pipeline;
forwarding the flip token from the last stage component in the graphics pipeline on the feedback path to the second portion of the predetermined component;
waiting at the predetermined component for a signal to be received from a display interface unit; and
programming a register of the display interface unit with data associated with the flip token.

16. The method of claim 15, further comprising the steps of:
buffering a number of flip tokens received on the feedback path, wherein an output of the buffer forwards the flip tokens received on the feedback path to the second portion of the predetermined component according to an order received.

17. The method of claim 1, wherein the application generated GPU instruction is an internal stall instruction, the method further comprising the steps of:
receiving the internal stall instruction in the input stream at the first portion of the predetermined component;
checking a flip counter to determine if a value of the counter is equal to a predefined value;
checking for receipt of a predefined signal from a predefined unit if the value of the counter is equal to the predefined value; and
stalling the predetermined component from additional operations until the predefined signal is received.

18. The method of claim 17, further comprising the step of:
checking periodically a wait mask counter; and
stalling the predetermined component from additional operations if the wait mask counter is not a predefined value.

19. The method of claim 17, wherein the predefined unit is a display interface unit in a graphics processing unit.

20. The method of claim 17, further comprising the steps of:
decrementing the counter if the value of the counter is greater than the predefined value.

21. The method of claim 17, wherein the predefined value is zero (0).

22. The method of claim 1, wherein the application generated GPU instruction is a trigger instruction, the method further comprising the steps of:
receiving the trigger instruction in the input stream at the first portion of the predetermined component;
outputting an operation code instruction to a target component in the graphics pipeline coupled to the first portion of the predetermined component;
causing the target component to execute an instructed action in correspondence with an encoded portion of the operation code instruction;
communicating a response from the target component on the feedback path to the second portion of the predetermined component upon execution of the instructed action; and
implementing a responsive action upon receipt of the response on the feedback path.

23. The method of claim 22, wherein the instructed action is one of a preload action, a flush action, a drain action, a cache invalidate action and a wait (stall) mask update action.

24. The method of claim 22, wherein the operation code instruction is contained in the trigger instruction.

25. The method of claim 22, wherein the responsive action is a clearing of a wait mask previously set at the receipt of the trigger instruction.

26. The method of claim 1, wherein the application generated GPU instruction is a wait mask instruction, the method further comprising the steps of:
receiving a wait instruction in the input stream at the first portion of the predetermined component with a wait mask set portion;
receiving a target operation command at the first portion of the predetermined component that is forwarded to an auxiliary block in the graphics pipeline, wherein the auxiliary block performs a predetermined operation in correspondence with data in the target operation;
receiving a wait clear trigger instruction at the first portion of the predetermined component that is forwarded to the auxiliary block in the graphics pipeline and subsequently back from the auxiliary block in the graphics pipeline to the second portion of the predetermined component; and
receiving an internal wait command with a wait mask status check at the first portion of the predetermined component, wherein a determination is made whether the wait clear trigger instruction has been received by the second portion of the predetermined component such that the wait mask set portion is cleared.

27. The method of claim 26, wherein the predetermined component ceases processing instructions after receipt of the internal wait command with the wait mask status check until determination of receipt of the wait clear instruction by the second portion of the predetermined component is made.

28. A controller processor in a graphics pipeline, comprising:

an input coupled to a processing unit that executes an application and communicates data and instructions to a first portion of the controller processor;

an output coupled to the first portion of the controller processor and to a first processing block of a graphics pipeline, wherein the controller processor forwards tokens to the first processing block of the graphics pipeline;

an input coupled to a second portion of the controller processor and to a second processing block of the graphics pipeline, wherein the second processing block of the graphics pipeline forwards tokens to the second portion of the controller processor causing a corresponding responsive action in the controller processor; and a counter that may be increased and decreased in association with a predetermined condition, wherein the controller processor implements select actions in correspondence as to whether the counter is equal to zero, wherein the first portion of the controller processor may decrement the counter if the counter has a value that is not equal to zero, and wherein the first portion of the controller processor may reset an instruction pointer of a context being implemented by the controller processor if the counter has a value that is equal to zero.

29. The controller processor of claim 28, further comprising:

a communication path coupled to a memory access unit, wherein the controller processor communicates a check surface fault command to the memory access unit via the communication path, and wherein the memory access unit communicates a command to the controller processor if data corresponding to a surface is unavailable in the memory access unit.

30. The controller processor of claim 28, wherein the token forwarded by the first portion of the controller processor is a trap token inserted at the end of a set of data or commands, wherein the trap token is forwarded on the input coupled to the second portion of the controller processor after logically traveling through the graphics pipeline.

31. A controller processor in a graphics pipeline, comprising:

an input coupled to a processing unit that executes an application and communicates data and instructions to a first portion of the controller processor;

an output coupled to the first portion of the controller processor and to a first processing block of a graphics pipeline, wherein the controller processor forwards tokens to the first processing block of the graphics pipeline;

an input coupled to a second portion of the controller processor and to a second processing block of the graphics pipeline, wherein the second processing block of the graphics pipeline forwards tokens to the second portion of the controller processor causing a corresponding responsive action in the controller processor;

a counter that may be increased and decreased in association with a predetermined condition, wherein the controller processor implements select actions in correspondence as to whether the counter is equal to zero;

a trigger command received on an input to the controller processor that sets a wait mask bit to a predetermined state;

a dump command that is received by the first portion of the controller processor and forwarded to a memory access unit, wherein the memory access unit implements a predetermined action in association with the dump command;

a clear wait mask trigger that is received by the first portion of the controller processor and forwarded to the memory access unit, wherein the memory access unit forwards the clear wait mask trigger to the second portion of the controller processor, and wherein the second portion of the controller processor changes the predetermined state of the wait mask bit; and a wait mask instruction received by the first portion of the controller processor that causes the controller processor to refrain from implementing a next instruction until the predetermined state of the wait mask bit is changed.

32. The controller processor of claim 31, wherein the first portion of the controller processor may decrement the counter if the counter has a value that is not equal to zero, and wherein the first portion of the controller processor may wait for a signal to be received by the controller processor before continuing to a next action if the counter has a value that is equal to zero.

\* \* \* \* \*